(12) United States Patent
Moriya et al.

(10) Patent No.: US 10,151,640 B2
(45) Date of Patent: Dec. 11, 2018

(54) LIGHT BEAM MEASUREMENT DEVICE, LASER APPARATUS, AND LIGHT BEAM SEPARATOR

(71) Applicant: Gigaphoton Inc., Tochigi (JP)

(72) Inventors: Masato Moriya, Oyama (JP); Osamu Wakabayashi, Oyama (JP); Yoshinobu Watabe, Oyama (JP)

(73) Assignee: Gigaphoton Inc., Tochigi (JP)

( * ) Notice: Subject to any disclaimer, the term of this patent is extended or adjusted under 35 U.S.C. 154(b) by 1 day.

(21) Appl. No.: 15/800,329

(22) Filed: Nov. 1, 2017

(65) Prior Publication Data

US 2018/0052059 A1 Feb. 22, 2018

Related U.S. Application Data

(60) Division of application No. 14/947,335, filed on Nov. 20, 2015, now Pat. No. 9,835,495, which is a (Continued)

(30) Foreign Application Priority Data

Jun. 27, 2013 (JP) .................................. 2013-134707

(51) Int. Cl.
*G01J 11/00* (2006.01)
*H01S 3/134* (2006.01)
(Continued)

(52) U.S. Cl.
CPC .............. *G01J 11/00* (2013.01); *G01J 1/0414* (2013.01); *G01J 1/0429* (2013.01);
(Continued)

(58) Field of Classification Search
CPC ...... G01J 1/0414; G01J 1/0429; G01J 1/0477; G01J 4/04; G01J 2001/4261;
(Continued)

(56) References Cited

U.S. PATENT DOCUMENTS 4,081,760 A 3/1978 Berg
4,627,688 A 12/1986 Kobayashi et al.
(Continued)

FOREIGN PATENT DOCUMENTS

JP S53-013390 A 2/1978
JP 2724993 B2 3/1998
(Continued)

OTHER PUBLICATIONS

Choi et al., "Enhancing Lithography Process Control Through Advanced, On-board Beam Parameter Metrology for Wafer Level Monitoring of Light Source Parameters," Proc. of SPIE, vol. 8326, 836260 (2012).
(Continued)

*Primary Examiner* — Sang Nguyen
(74) *Attorney, Agent, or Firm* — Studebaker & Brackett PC

(57) ABSTRACT

A light beam measurement device includes: a polarization measurement unit including a first measurement beam splitter provided on an optical path of a laser beam and configured to measure a polarization state of the laser beam having been partially reflected by the first measurement beam splitter; a beam profile measurement unit including a second measurement beam splitter provided on the optical path of the laser beam and configured to measure a beam profile of the laser beam having been partially reflected by the second measurement beam splitter; and a laser beam-directional stability measurement unit configured to measure a stability in a traveling direction of the laser beam, while the first measurement beam splitter and the second measurement beam splitter are made of a material containing $CaF_2$.

20 Claims, 30 Drawing Sheets

Related U.S. Application Data continuation of application No. PCT/JP2014/067270, filed on Jun. 27, 2014.

(51) Int. Cl.

| | | |
|---|---|---|
| *G02B 27/14* | (2006.01) | |
| *G02B 5/30* | (2006.01) | |
| *G01J 4/04* | (2006.01) | |
| *H01S 3/00* | (2006.01) | |
| *G01J 1/04* | (2006.01) | |
| *G01J 1/42* | (2006.01) | |
| *H01S 3/23* | (2006.01) | |

(52) U.S. Cl.
CPC ............ *G01J 1/0477* (2013.01); *G01J 1/4257* (2013.01); *G01J 4/04* (2013.01); *G02B 5/3066* (2013.01); *G02B 27/148* (2013.01); *H01S 3/0014* (2013.01); *H01S 3/134* (2013.01); *G01J 2001/4261* (2013.01); *H01S 3/2366* (2013.01)

(58) Field of Classification Search
CPC ... G02B 5/3066; G02B 27/148; H01S 3/0014; H01S 3/134; H01S 3/2366
See application file for complete search history.

(56) References Cited

U.S. PATENT DOCUMENTS

| | | | |
|---|---|---|---|
| 4,687,301 A | 8/1987 | Ledebuhr | |
| 5,128,798 A | 7/1992 | Bowen et al. | |
| 5,309,422 A | 5/1994 | Kuroki et al. | |
| 5,790,306 A | 8/1998 | Kleinberg et al. | |
| 6,008,497 A | 12/1999 | Mizoguchi et al. | |
| 6,084,897 A | 7/2000 | Wakabayashi et al. | |
| 6,700,690 B1 | 3/2004 | Buchsbaum et al. | |
| 8,599,381 B2* | 12/2013 | Statz .................... | G01J 3/0224 356/436 |
| 2001/0028664 A1 | 10/2001 | Vogler et al. | |
| 2002/0118721 A1 | 8/2002 | Bittenson | |
| 2004/0051947 A1 | 3/2004 | Kagawa et al. | |
| 2005/0036430 A1* | 2/2005 | Ikenaka ............... | G11B 7/1275 369/112.05 |
| 2010/0054297 A1* | 3/2010 | Wakabayashi ........... | G02B 1/02 372/103 |
| 2010/0117009 A1 | 5/2010 | Moriya et al. | |
| 2010/0128747 A1 | 5/2010 | Nagai et al. | |
| 2011/0158281 A1 | 6/2011 | Nagai et al. | |
| 2011/0170164 A1* | 7/2011 | Wang ..................... | G02B 5/286 359/290 |
| 2012/0236894 A1 | 9/2012 | Onose et al. | |
| 2012/0249970 A1 | 10/2012 | Ishimatsu | |
| 2012/0257168 A1 | 10/2012 | Ishimatsu | |
| 2013/0016338 A1* | 1/2013 | Bridges .............. | G01B 11/2527 356/51 |
| 2013/0322483 A1 | 12/2013 | Nagai et al. | |
| 2014/0009750 A1* | 1/2014 | Schussler .................. | G01P 3/36 356/28.5 |
| 2014/0050239 A1 | 2/2014 | Nagai et al. | |

FOREIGN PATENT DOCUMENTS

| | | |
|---|---|---|
| JP | 11-201869 A | 7/1999 |
| JP | H11-258526 A | 9/1999 |
| JP | 2001-066138 A | 3/2001 |
| JP | 2002-048911 A | 2/2002 |
| JP | 2002-280651 A | 9/2002 |
| JP | 2003-521683 A | 7/2003 |
| JP | 2006-179600 A | 7/2006 |
| JP | 3864287 B2 | 12/2006 |
| JP | 2007-509316 A | 4/2007 |
| JP | 2007-214189 A | 8/2007 |
| JP | 2008-055436 A | 3/2008 |
| JP | 2009-081363 A | 4/2009 |
| JP | 2010-050299 A | 3/2010 |
| WO | 2005/033625 A1 | 4/2005 |
| WO | 2009/125745 A1 | 10/2009 |

OTHER PUBLICATIONS

International Search Report with Written Opinion for PCT/JP2014/067270 dated Sep. 22, 2014.

An Office Action; issued by the Japanese Patent Office dated Dec. 6, 2017, which corresponds to Japanese Patent Application No. 2015-524146 and is related to U.S. Appl. No. 15/800,329; with English language translation.

An Office Action mailed by the Japanese Patent Office dated Sep. 4, 2018, which corresponds to Japanese Patent Application No. 2015-524146 and is related to U.S. Appl. No. 15/800,329; with English language translation.

* cited by examiner

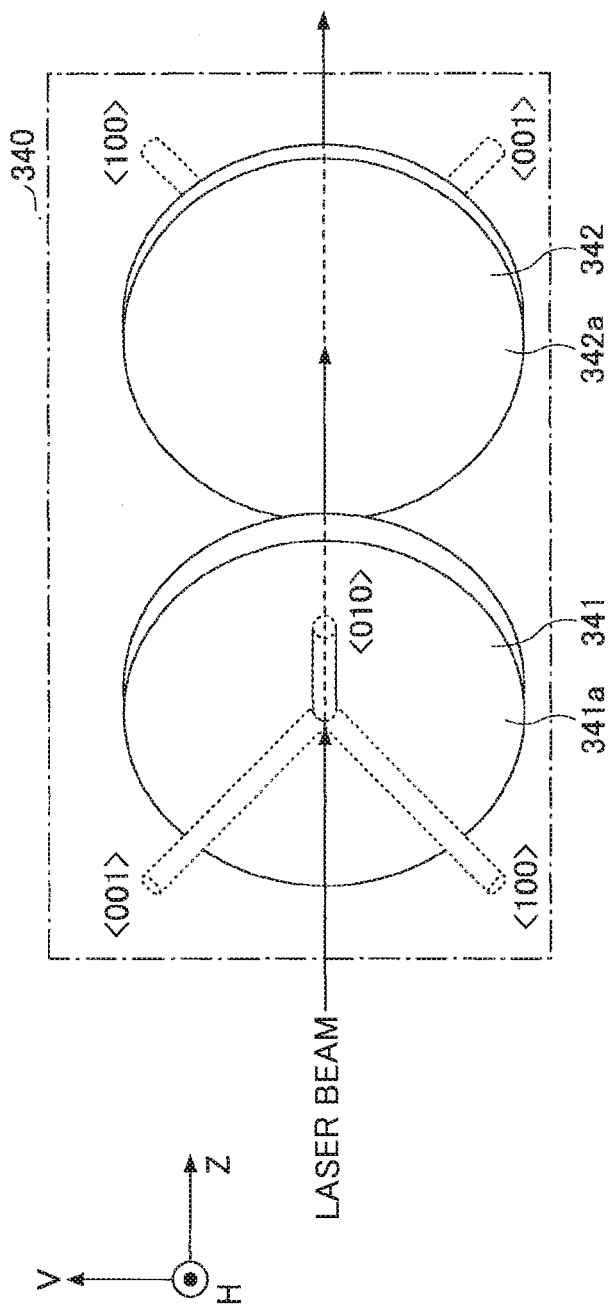

LIGHT BEAM MEASUREMENT DEVICE, LASER APPARATUS, AND LIGHT BEAM SEPARATOR

CROSS-REFERENCE TO RELATED APPLICATIONS

This application is a Divisional Application of U.S. patent application Ser. No. 14/947,335, filed Nov. 20, 2015, which is a Continuation Application of International Patent Application No. PCT/JP2014/067270, filed Jun. 27, 2014, which claims benefit of priority to International Patent Application No. PCT/JP2014/051295, filed Jan. 22, 2014 and Japanese patent Application No. 2013-134707, filed Jun. 27, 2013, the entire content of which is incorporated herein by reference.

BACKGROUND

1. Technical Field

The present disclosure relates to a light beam measurement device, a laser apparatus and a light beam separator.

2. Related Art

The miniaturization and increased levels of integration of semiconductor integrated circuits have led to a demand for increases in the resolutions of semiconductor exposure apparatuses (hereinafter referred to as "exposure apparatus"). Accordingly, advances are being made in the reduction in the wavelengths of light emitted from exposure light sources. Gas laser apparatuses are being used as exposure light sources instead of conventional mercury lamps. At present, a KrF excimer laser apparatus that emits ultraviolet light at a wavelength of 248 nm and an ArF excimer laser apparatus that emits ultraviolet light at a wavelength of 193 nm are being used as gas laser apparatuses for exposure.

In a next generation exposure technology, immersion exposure has been studied, for reducing the apparent wavelength of an exposure light source by filling the space between the projection lens of an exposure apparatus and a wafer with a liquid, and changing the refractive index of the space. In the case where immersion exposure is carried out using an ArF excimer laser apparatus as the exposure light source, the wafer is irradiated with ultraviolet light at a wavelength of 134 nm in the liquid. This technology is referred to as ArF immersion exposure or ArF immersion lithography.

The spectral width of the spontaneous oscillation of a KrF or ArF excimer laser apparatus is as wide as 350 to 400 pm. Therefore, when the projection lens of this apparatus is used, chromatic aberration occurs, and consequently the resolution is dropped. It is therefore necessary to narrow the spectral line width (spectral width) of the laser beam emitted from the gas laser apparatus to the extent that the chromatic aberration is negligible. Accordingly, the spectral width has been narrowed by providing a line narrowing module (LNM) having line narrowing elements such as an etalon and a grating in the laser resonator of the gas laser apparatus. A laser apparatus having a narrowed spectral width in this manner is referred to as a line narrowing laser apparatus.

CITATION LIST

Patent Literature

PTL1: Japanese Patent Application Laid-Open No. 2010-50299

PTL2: Japanese Patent Application Laid-Open No. 1999-201869

PTL3: Japanese Patent No. 2724993

PTL4: Japanese Patent No. 3864287

PTL5: International Publication No. WO2009/125745 pamphlet

Nonpatent Literature

NPTL1: Jinphil Choi et. al., "Enhancing Lithography Process Control Through Advanced, On-board Beam Parameter Metrology for Wafer Level Monitoring of Light Source Parameters", Proc. of SPIE Vol. 8326, 836260 (2012).

SUMMARY

A light beam measurement device may include a polarization measurement unit including a first measurement beam splitter provided on an optical path of a laser beam and configured to measure a polarization state of the laser beam having been partially reflected by the first measurement beam splitter; a beam profile measurement unit including a second measurement beam splitter provided on the optical path of the laser beam and configured to measure a beam profile of the laser beam having been partially reflected by the second measurement beam splitter; and a laser beam-directional stability measurement unit configured to measure a stability in a traveling direction of the laser beam. The first measurement beam splitter and the second measurement beam splitter may be made of a material containing $CaF_2$.

A light beam measurement device may include a polarization measurement unit configured to measure a polarization state of a laser beam; a beam profile measurement unit configured to measure a beam profile of the laser beam; a laser beam-directional stability measurement unit configured to measure a stability in a traveling direction of the laser beam; and a plurality of measurement beam splitters made of a material containing $CaF_2$ and provided on an optical path of the laser beam. The polarization measurement unit, the beam profile measurement unit and the laser beam-directional stability measurement unit may measure laser beams split by the plurality of measurement beam splitters, respectively.

A light beam separator may include a first separator substrate formed by a wedged substrate and provided on an optical path of a laser beam; and a second separator substrate formed by a wedged substrate and provided on the optical path of the laser beam. The first separator substrate may be configured such that the laser beam having entered a first surface of the first separator substrate is partially reflected by the first surface to separate part of the laser beam. The second separator substrate may be configured such that the laser beam having entered the first surface of the first separator substrate and transmitted through the first separator substrate exits a second surface of the first separator substrate, enters a first surface of the second separator substrate, and exits a second surface of the second separator substrate. The first surface of the first separator substrate and the second surface of the second separator substrate may be approximately parallel to one another. The second surface of the first separator substrate and the first surface of the second separator substrate may be approximately parallel to one another. A thickness of the first separator substrate and a thickness of the second separator substrate may be approximately the same on the optical path of the laser beam.

BRIEF DESCRIPTION OF THE DRAWINGS

Hereinafter, selected embodiments of the present disclosure will be described with reference to the accompanying drawings.

FIG. 5B is a drawing explaining the light beam separator formed by a $CaF_2$ crystal;

DESCRIPTION OF EXEMPLARY EMBODIMENTS

Figure 1:
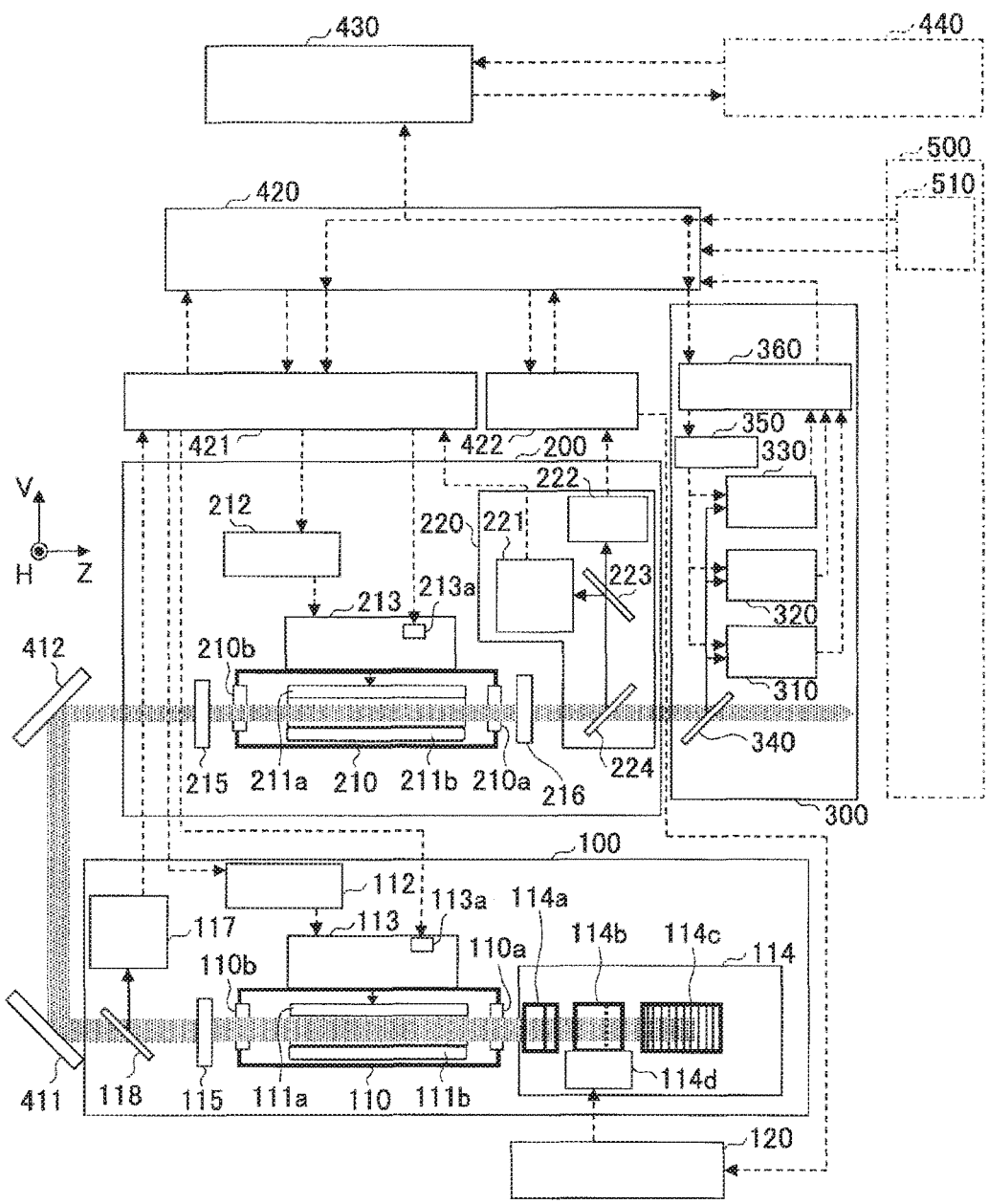
FIG. 1 is a schematic view showing an exemplary laser apparatus according to an aspect of the present disclosure.

Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

Table of Contents

1. Description of terms
2. Laser apparatus
2.1 Problem
2.2 Configuration
2.3 Operation
2.4 Effect
3. Light beam separating part (light beam separator)
3.1 Configuration
3.2 Operation
3.3 Effect
3.4 Crystal orientation of $CaF_2$ crystal
4. Embodiment 1 (light beam measurement device)
4.1 Configuration
4.2 Operation
4.3 Effect
4.4 Measurement of polarization
4.5 Measurement of beam profile
4.6 Measurement of stability in traveling direction of laser beam
5. Embodiment 2 (light beam measurement device)
6. Method of measuring light beam by light beam measurement device
6.1 Method of measuring light beam by light beam measurement device according to Embodiment 1
6.2 Method of measuring light beam by light beam measurement device according to Embodiment 2
7. Embodiment 3 (laser apparatus)
8. Controller
9. Specific configuration of light beam separator
10. Embodiment 4 (light beam measurement device)

1. Description of Terms

Terms used in the present disclosure will be defined as follows. "Optical path" means a path through which a laser beam passes. "Optical path length" is a product of the distance of the optical path for which light actually passes through and the refractive index of a medium through which the light passes. "Amplifying wavelength range" means a wavelength range of a laser beam for which the laser beam passing through an amplifying region can be amplified.

"Upstream" means the light source side of a laser beam traveling along the optical path. Meanwhile, "downstream" means the exposure surface side of the laser beam traveling along the optical path. The optical path may be an axis that passes through an approximate center of the beam cross-section of the laser beam along the traveling direction of the laser beam.

In the present disclosure, the traveling direction of the laser beam is defined as "Z-direction". In addition, one direction perpendicular to the Z-direction is defined as "X-direction", and one direction perpendicular to the X-direction and the Z-direction is defined as "Y-direction." The X-direction and the Y-direction may be changed depending on the position of the current laser beam in the explanation, while the traveling direction of the laser beam is defined as the Z-direction. For example, after the traveling direction (Z-direction) of the laser beam changes in the X-Z plane, the X-direction is changed according to the change in the traveling direction while the Y-direction is not changed. On the other hand, after the traveling direction (Z-direction) of the laser beam changes in the Y-Z plane, the Y-direction is changed according to the change in the traveling direction while the X-direction is not changed. Here, in the present disclosure, the X-direction may be referred to as "H-direction", and the Y-direction may be referred to as "V-direction."

When a plane containing both the optical axis of the laser beam entering a reflective optical element and the optical axis of the laser beam reflected by the reflective optical element is defined as a plane of incidence, "S-polarization" is defined as a polarization state in the direction perpendicular to the plane of incidence. Meanwhile, "P-polarization" is defined as a polarization state in the direction orthogonal to the optical path and parallel to the plane of incidence.

2. Laser Apparatus

2.1 Problem

A KrF or ArF excimer laser apparatus may include a light beam measurement device for measuring the beam profile of a pulsed laser beam emitted from the laser apparatus, the stability in the traveling direction of the pulsed laser beam traveling to an exposure apparatus, and the degree of the polarization of the pulsed laser beam. It is preferred that such a light beam measurement device is compact, because the device is installed in the excimer laser apparatus. In addition, it is preferred that the light beam measurement device is highly durable against the emission of a strong pulsed laser beam for a long time. Moreover, it is preferred that the optical axis of the pulsed laser beam emitted from the excimer laser apparatus is not changed even if the light beam measurement device is installed in the excimer laser apparatus.

2.2 Configuration

FIG. 1 shows an excimer laser apparatus according to an aspect of the present disclosure. Here, with the present disclosure, "excimer laser apparatus" may simply be referred to as "laser apparatus." The laser apparatus of the present disclosure may be a double chamber laser apparatus. To be more specific, the laser apparatus of the present disclosure may include an MO (master oscillator) 100, a PO (power oscillator) 200, a light beam measurement device 300, a first high-reflection mirror 411, a second high-reflection mirror 412, a laser controller 420, an energy controller 421, a wavelength controller 422, and a data collecting and processing system 430.

The MO 100 may be a laser oscillator system. The MO 100 may include an MO laser chamber 110, an MO charger 112, an MO-PPM (pulse power module) 113, a laser resonator, and an MO energy measurement unit 117.

The MO laser chamber 110 may include a pair of electrodes 111a and 111b, and two windows 110a and 110b that allow a pulsed laser beam to transmit therethrough. In addition, the MO laser chamber 110 may contain laser gas as a laser gain medium, which is supplied from a laser gas supply part (not shown). Here, with the present disclosure, one of the pair of electrodes 111a and 111b may be referred to as a first electrode 111a, and the other may be referred to as a second electrode 111b.

The laser resonator may include an LNM (line narrowing module) 114, and an OC (output coupler) mirror 115. The MO laser chamber 110 may be provided on the optical path of the laser resonator.

The LNM 114 may include a prism 114a, a prism 114b, a grating 114c, and a rotation stage 114d on which the prism 114b is rotated. The prisms 114a and 114b may expand the width of a laser beam. In the LNM 114, the grating 114c may be arranged in a Littrow configuration, so that the laser apparatus may generate a pulsed laser beam with a target wavelength. The rotation stage 114d may be connected to a wavelength adjusting part 120, and therefore the wavelength of the pulsed laser beam may be adjusted by rotating the prism 114b on the rotation stage 114d.

The OC mirror 115 may be a partial reflection mirror configured to reflect part of the pulsed laser beam and to allow the other part of the pulsed laser beam to transmit therethrough.

The MO energy measurement unit 117 may measure the energy of the pulsed laser beam. The pulsed laser beam having transmitted through the OC mirror 115 may be partially reflected by a beam splitter 118 provided on the optical path of the pulsed laser beam, and therefore be split. Then, the split pulsed laser beam may enter the MO energy measurement unit 117. The pulse energy of the pulsed laser beam having entered the MO energy measurement unit 117 may be measured by the MO energy measurement unit 117. The value of the measured pulse energy may be sent to the energy controller 421.

The MO-PPM 113 may include a capacitor (not shown), and be connected to the pair of electrodes 111a and 111b. In addition, the MO-PPM 113 may include a switch 113a. A trigger signal may be inputted from the energy controller 421 to the switch 113a, so that an electric discharge may be generated between the pair of electrodes 111a and 111b. The MO charger 112 may be connected to the capacitor (not shown) provided in the MO-PPM 113.

The laser gas contained in the MO laser chamber 110 may include rare gas such as Ar and Kr, halogen gas such as $F_2$ gas, and buffer gas such as Ne, He, and mixed gas thereof.

The PO 200 may include a PO laser chamber 210, a PO charger 212, a PO-PPM 213, a partial reflection mirror 215, an OC mirror 216, and a PO laser beam measurement part 220.

The PO laser chamber 210 may include a pair of electrodes 211a and 211b, and two windows 210a and 210b that allow a pulsed laser beam to transmit therethrough. In addition, the PO laser chamber 210 may contain laser gas as a laser gain medium, which is supplied from a laser gas supply part (not shown). Here, with the present disclosure, one of the pair of electrodes 211a and 211b may be referred to as a first electrode 211a, and the other may be referred to as a second electrode 211b.

The PO laser chamber 210 may be provided on the optical path of the pulsed laser beam between the partial reflection mirror 215 and the OC mirror 216.

The partial reflection mirror 215 may reflect part of the pulsed laser beam and allow the other part of the pulsed laser beam to transmit therethrough. The OC mirror 216 may be a partial reflection mirror configured to reflect part of the pulsed laser beam and to allow the other part of the pulsed laser beam to transmit therethrough.

The PO laser beam measurement part 220 may include a PO energy measurement unit 221, a spectrum measurement unit 222, and beam splitters 223 and 224. The beam splitter 224 may be provided on the optical path of the pulsed laser beam having transmitted through the OC mirror 216. The beam splitter 224 may reflect part of the pulsed laser beam having transmitted through the OC mirror 216 in the direction in which the PO energy measurement unit 221 and the spectrum measurement unit 222 are provided, so that the pulsed laser beam is split. The pulsed laser beam which has been reflected and split by the beam splitter 224 may be further split into a pulsed laser beam transmitting through the beam splitter 223 and a pulsed laser beam reflected by the beam splitter 223. The pulsed laser beam having transmitted through the beam splitter 223 may enter the spectrum measurement unit 222. Meanwhile, the pulsed laser beam having been reflected by the beam splitter 223 may enter the PO energy measurement unit 221. Information on the spectrum of the pulsed laser beam measured by the spectrum measurement unit 222 may be sent to the wavelength controller 422. The value of the pulse energy measured by the PO energy measurement unit 221 may be sent to the energy controller 421.

The PO-PPM 213 may include a capacitor (not shown), and be connected to the pair of electrodes 211a and 211b. In addition, the PO-PPM 213 may include a switch 213a. A trigger signal may be inputted from the energy controller 421 to the switch 213a, so that an electric discharge may be generated between the pair of electrodes 211a and 211b. The PO charger 212 may be connected to the capacitor (not shown) provided in the PO-PPM 213.

The laser gas contained in the PO laser chamber 210 may include rare gas such as Ar and Kr, halogen gas such as $F_2$ gas, and buffer gas such as Ne, He, and mixed gas thereof.

The first high-reflection mirror 411 and the second high-reflection mirror 412 may reflect the pulsed laser beam emitted from the MO 100 so that the pulsed laser beam enters the PO 200.

The light beam measurement device 300 may include a polarization measurement unit 310, a beam profile measurement unit 320, a laser beam-directional stability measurement unit 330, a light beam separating part 340, a controller 350, and a beam measurement controller 360. The light beam measurement device 300 may be provided on the optical path of the pulsed laser beam emitted from the PO 200. In the present disclosure, the light beam separating part may be referred to as "light beam separator."

2.3 Operation

The laser controller 420 may receive a target pulse energy Et, a target wavelength λt, and a light emission trigger signal from an exposure apparatus controller 510 of an exposure apparatus 500. The laser controller 420 may send the received target pulse energy Et and light emission trigger signal to the energy controller 421, and also send the received target wavelength λt to the wavelength controller 422.

The energy controller 421 may set a charging voltage Vhvmo in the MO charger 112 and also set a charging voltage Vhvpo in the PO charger 212 to control such that the pulse energy of the pulsed laser beam is the received target pulse energy Et.

Upon receiving a light emission trigger signal from the exposure apparatus controller 510, the laser controller 420 may send the light emission trigger signal directly to the energy controller 421. In addition, the laser controller 420 may send the time at which the light emission trigger signal is inputted and the interval between the light emission trigger signals, to the data collecting and processing system 430.

The energy controller 421 may send trigger signals to the switch 113a of the MO-PPM 113 and the switch 213a of the PO-PPM 213, in synchronization with the received light emission trigger signal. To be more specific, the energy controller 421 may send the trigger signals to the switch 113a and the switch 213a to generate an electric discharge between the pair of electrodes 211a and 211b when the pulsed laser beam emitted from the MO 100 enters a discharge region of the PO laser chamber 210.

In the MO 100, when a trigger signal is inputted from the energy controller 421 to the switch 113a of the MO-PPM 113, an electric discharge may be generated between the pair of electrodes 111a and 111b in the MO laser chamber 110, in synchronization with the inputted trigger signal.

This electric charge excites the laser gas in the MO laser chamber 110, and therefore laser oscillation occurs between the OC mirror 115 and the LNM 114, so that a pulsed laser beam with a narrow spectral line width may be emitted from the OC mirror 115. A pulse energy Emo of the pulsed laser beam may be detected by the MO energy measurement unit 117, and the value of the detected pulse energy Emo may be sent to the energy controller 421.

The narrow-band laser (seed) beam emitted from the MO 100 may be reflected by the first high-reflection mirror 411 and the second high-reflection mirror 412, and enter the partial reflection mirror 215 of PO 200.

The seed beam having entered the partial reflection mirror 215 may transmit through the partial reflection mirror 215, enter the PO laser chamber 210, and pass through the discharge region of the PO laser chamber 210. At this timing, an electric discharge may be generated between the pair of electrodes 210a and 210b in the PO laser chamber 210, so that the laser gas may be excited. By this means, the seed beam may be amplified by a laser resonator formed by the partial reflection mirror 215 and OC mirror 216, and therefore be oscillated.

The pulsed laser beam emitted from the OC mirror 216 may enter the PO laser beam measurement part 220, be reflected by the beam splitter 224 and the beam splitter 223, and enter the PO energy measurement unit 221. The PO energy measurement unit 221 may detect a pulse energy Epo of the received pulsed laser beam, and send the value of the detected pulse energy Epo to the energy controller 421. In addition, the pulsed laser beam having entered the PO laser beam measurement part 220 may be reflected by the beam splitter 224, transmit through the beam splitter 223, and enter the spectrum measurement unit 222. The spectrum measurement unit 222 may measure the spectrum of the received pulsed laser beam, and send information on the measured spectrum of the pulsed laser beam to the wavelength controller 422.

The beam splitters 223 and 224 may be formed by planer substrates parallel to one another, and be arranged such that the pulsed laser beam enters the beam splitters 223 and 224 at 45 degrees. Each of the beam splitters 223 and 224 may be made of a $CaF_2$ crystal, and may not include a dielectric multilayer formed thereon to partially reflect the pulsed laser beam.

In the MO 100, feedback control of the charging voltage Vhvmo may be performed to control such that the pulse energy of the pulsed laser beam is a predetermined pulse energy Emot with which the pulsed laser beam can be amplified and oscillated by the PO 200, based on the value of the pulse energy Emo detected by the MO energy measurement unit 117.

In the PO 200, feedback control of the charging voltage Vhvpo may be performed to control such that the pulse energy of the pulsed laser beam is the target pulse energy Et from the exposure apparatus controller 510 of the exposure apparatus 500, based on the value of the pulse energy Epo detected by the PO energy measurement unit 221.

Here, the energy controller 421 may send to the laser controller 420 data related to the energy control, such as the measured pulsed energies Emo and Epo, and charging voltages Vmo and Vpo. The data may be received by the laser controller 420, and then sent to the data collecting and processing system 430.

The wavelength controller 422 may receive the target wavelength λt sent from the laser controller 420. The wavelength controller 422 may cause the wavelength adjusting part 120 to perform the feedback control, based on a difference 6A between the target wavelength λt received from the laser controller 420 and the wavelength λ measured by the spectrum measurement unit 222.

Here, the wavelength controller 422 may send data related to the wavelength control, such as the measured wavelength λ and a spectral line width Δλ, to the laser controller 420. The data may be received by the laser controller 420, and then sent to the data collecting and processing system 430.

In addition, the beam measurement controller 360 may measure the pulsed laser beam emitted from the PO 200, in synchronization with a burst (light emission trigger), and may send data on the beam properties such as the beam profile, the beam divergence, the stability in the traveling direction of the pulsed laser beam, and the degree of polarization, to the laser controller 420. The data received by the laser controller 420 may further be sent to the data collecting and processing system 430.

The above-described actions may be performed every time the laser controller 420 receives the light emission trigger signal. In addition, the measurement parameters may be stored in the data collecting and processing system 430 every time the laser controller 420 receives the light emission trigger signal.

The laser controller 420 may perform recognition per wafer and per scan, based on the time interval of the light emission trigger signal, substitute the data, process the data, and send the data to an FDC system 440.

2.4 Effect

The light beam measurement device 300 may measure the beam profile, the beam divergence, the stability in the traveling direction, and the degree of polarization of the pulsed laser beam emitted from the PO 200. By this means, the light beam measurement device 300 may collect data on the beam properties of the pulsed laser beam that is emitted from the PO 200 and enters the exposure apparatus 500.

3. Light Beam Separating Part (Light Beam Separator)

3.1 Configuration

Figure 2:
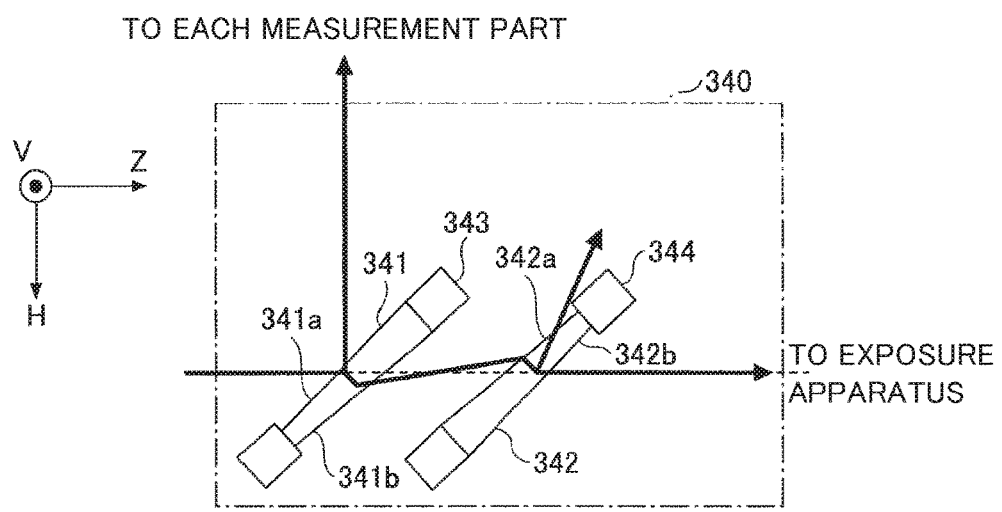
FIG. 2 is a configuration diagram showing a light beam separator in the exemplary laser apparatus according to an aspect of the present disclosure.
Figure 3:
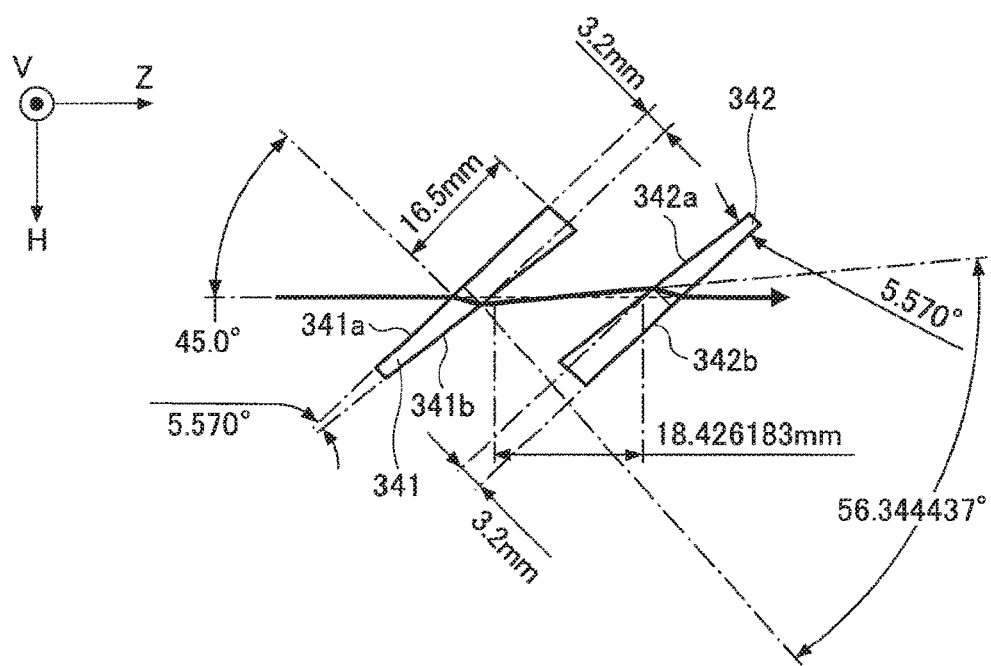
FIG. 3 is a drawing explaining the light beam separator in the exemplary laser apparatus according to an aspect of the present disclosure.

As shown in FIGS. 2 and 3, the light beam separator 340 may include a separator beam splitter 341 and a separator cancel window 342. Here, in the present disclosure, the separator beam splitter 341 may be referred to as "first separating substrate" and the separator cancel window 342 may be referred to as "second separating substrate."

The separator beam splitter 341 and the separator cancel window 342 may be made of the same material, and be formed by wedged substrates of the same shape. Here, the angle of inclination of one surface of each substrate with respect to the other surface, that is, the wedge angle may be 5.57 degrees. In addition, dielectric multilayers for partially reflecting a pulsed laser beam may not be formed on both surfaces of each of the separator beam splitter 341 and the separator cancel window 342.

The separator beam splitter 341 and the separator cancel window 342 may be formed such that the thickness of the substrates is approximately the same, about 3.2 mm, in the vicinity of the optical path of the pulsed laser beam. A first surface 341a and a second surface 341b of the separator beam splitter 341, and a first surface 342a and a second surface 342b of the separator cancel window 342 may be perpendicular to the Z-H plane.

The separator beam splitter 341 and the separator cancel window 342 may be made of $CaF_2$ crystals.

The first surface 341a of the separator beam splitter 341 and the second surface 342b of the separator cancel window 342 may be parallel to one another. Meanwhile, the second surface 341b of the separator beam splitter 341 and the first surface 342a of the separator cancel window 342 may be parallel to one another.

The separator beam splitter 341 may be held by a holder 343 such that the incident angle of the pulsed laser beam entering the first surface 341a is 45 degrees while the output angle of the pulsed laser beam exiting the second surface 341b is Brewster's angle (=56.34 degrees).

The separator cancel window 342 may be held by a holder 344 such that the incident angle of the pulsed laser beam entering the first surface 342a is the Brewster's angle (=56.34 degrees) while the output angle of the pulsed laser beam exiting the second surface 342b is 45 degrees.

The separator beam splitter 341 and the separator cancel window 342 may be arranged such that the distance between the second surface 341b and the first surface 342a is approximately 18.43 mm in the vicinity of the optical path of the pulsed laser beam.

The pulsed laser beam reflected by the first surface 341a of the separator beam splitter 341 may enter the polarization measurement unit 310, the beam profile measurement unit 320, and the laser beam-directional stability measurement unit 330.

3.2 Operation

Figure 4:
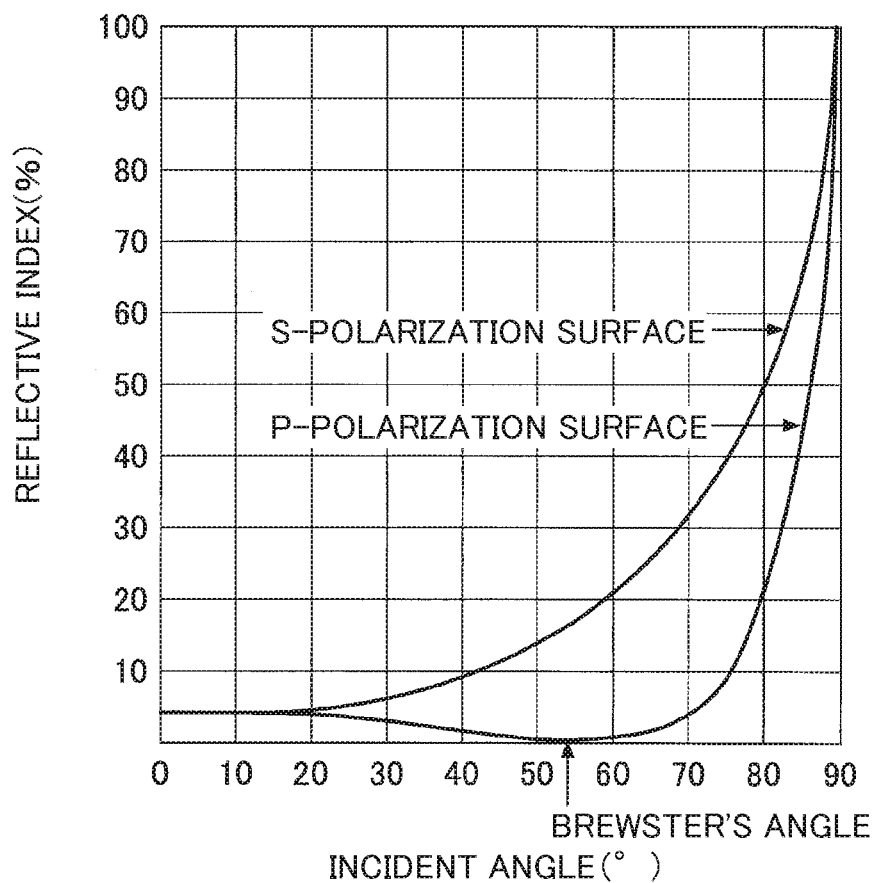
FIG. 4 is a drawing showing a correlation between incident angles and reflective indexes.

The pulsed laser beam having transmitted through the beam splitter 224 of the PO laser beam measurement part 220 may enter the first surface 341a of the separator beam splitter 341 at the incident angle of 45 degrees, and be partially reflected. The pulsed laser beam having entered the first surface 341a of the separator beam splitter 341 may be reflected by Fresnel reflection at the ratio of the P-polarization and the S-polarization as shown in FIG. 4.

As described above, the pulsed laser beam reflected by the first surface 341a of the separator beam splitter 341 may be used in the light beam measurement device 300, to measure the beam profile, the beam divergence, the stability in the traveling direction, and the degree of polarization of the pulsed laser beam. The angel of the pulsed laser beam emitted from the second surface 341b of the separator beam splitter 341 is the Brewster's angle (=56.34 degrees), and therefore it may be possible to prevent the reflection of the P-polarization component. The pulsed laser beam emitted from the second surface 341b of the separator beam splitter 341 may enter the first surface 342a of the separator cancel window 342 at the Brewster's angle (=56.34 degrees), and exit the second surface 342b at an output angle of 45 degrees.

3.3 Effect

In the light beam separator 340, the optical axis of the pulsed laser beam being out of the alignment due to the separator beam splitter 341 may be corrected by the separator cancel window 342, so that it is possible to prevent the optical axis from being out of the alignment. The pulsed laser beam exits and enters the second surface 341b of the separator beam splitter 341 and the first surface 342a of the separator cancel window 342 at the Brewster's angle (=56.34 degrees), so that it is possible to prevent the reflection of the polarization component in the H-direction.

When no dielectric multilayer for the partial reflection is formed on the separator beam splitter 341 and the separator cancel window 342, the pulsed laser beam may be reflected by only Fresnel reflection. By this means, it is possible to increase the durability and reduce the change in the reflective index, compared to the case in which the dielectric multilayers for partial reflection are formed.

For producing the wedges of the separator beam splitter 341 and the separator cancel window 342, for example, a plurality of wedges are formed by batch production, and then, two wedges that can provide the desired properties may be paired. An error in the production of the wedges of the separator beam splitter 341 and the separator cancel window 342 may be corrected by adjusting the position of separator cancel window 342.

3.4 Crystal Orientation of CaF$_2$ Crystal

The first surface 341a of the separator beam splitter 341, which is made of a CaF$_2$ crystal, may be ground to be approximately perpendicular to a <111> axis. The second surface 342b of the separator cancel window 342, which is made of a CaF$_2$ crystal, may be ground to be approximately perpendicular to the <111> axis.

As shown in FIGS. 5A, 5B, 6A and 6B, the separator beam splitter 341 may be arranged such that an angle α between the axis of the optical path of the pulsed laser beam entering the separator beam splitter 341 and a <001> axis is about 60 degrees, viewed from the <111> axis normal to the first surface 341a. That is, the optical path of the pulsed laser beam entering the separator beam splitter 341 may be approximately parallel to the plane containing the <111> axis and a <010> axis.

The separator cancel window 342 may be arranged such that the angle α between the axis of the optical path of the pulsed laser beam exiting the separator cancel window 342 and the <001> axis is about 60 degrees, viewed from the <111> axis normal to the second surface 342b. That is, the separator cancel window 342 may be arranged such that the optical path of the pulsed laser beam may be approximately parallel to the plane containing the <111> axis and the <010> axis.

Figure 5A:
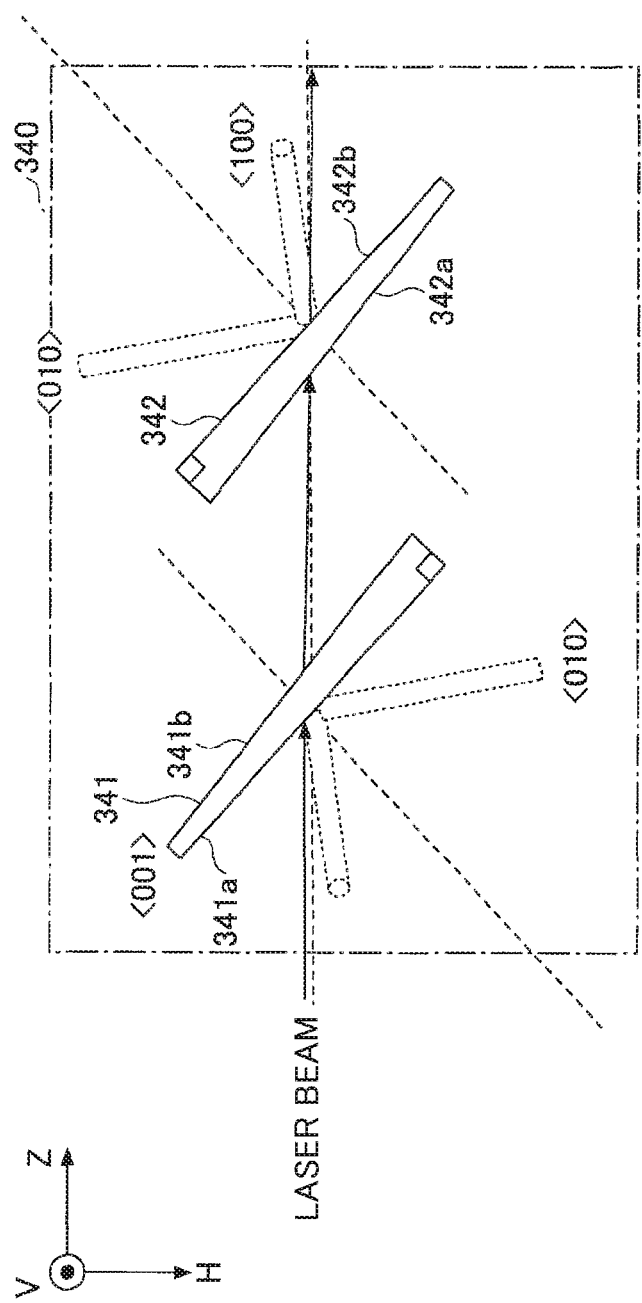
FIG. 5A is a drawing explaining the light beam separator formed by a $CaF_2$ crystal.
Figure 6A:
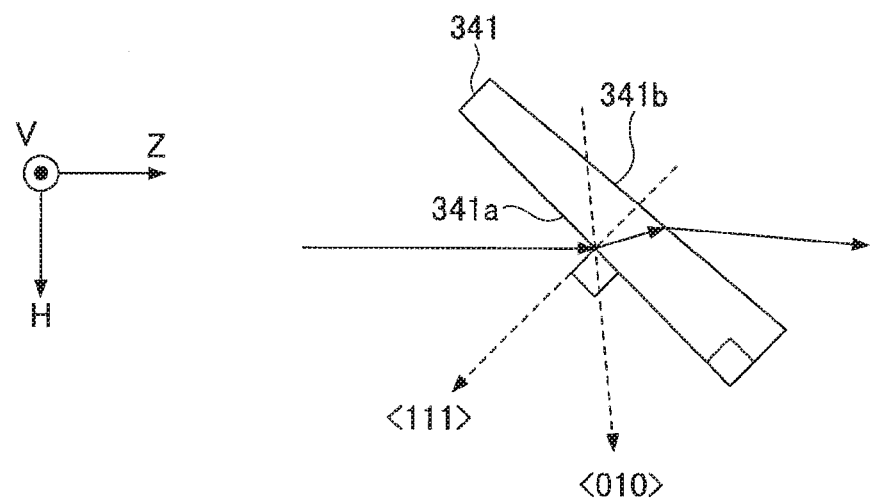
FIG. 6A is a drawing explaining the light beam separator formed by a $CaF_2$ crystal.
Figure 6B:
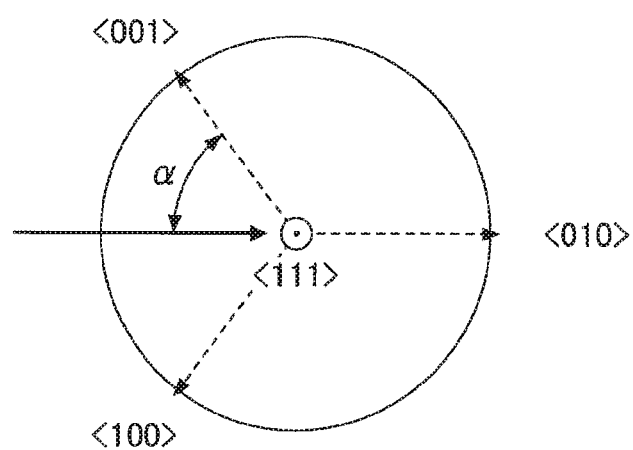
FIG. 6B is a drawing explaining the light beam separator formed by a $CaF_2$ crystal.

Here, FIG. 5A is a plan view showing the light beam separator 340, which is parallel to the H-Z plane. FIG. 5B is a plan view showing the light beam separator 340, which is parallel to the V-Z plane. In addition, FIG. 6A is a plan view showing the separator beam splitter 341, which is parallel to the H-Z plane. FIG. 6B is a plan view showing the first surface 341a of the separator beam splitter 341.

As described above, by providing the separator beam splitter 341 and the separator cancel window 342, it is possible to prevent the change in the polarization of the pulsed laser beam exiting the light beam separator 340, even if the separator beam splitter 341 and the separator cancel window 342 absorb the pulsed laser beam and therefore a thermal stress is generated therein.

Here, when the beam splitter 224 of the PO laser beam measurement part 220 is made of a CaF$_2$ crystal, the first and second surfaces of the beam splitter 224 may be ground to be approximately perpendicular to the <111> axis. The beam splitter 224 may be arranged such that the angle α between the axis of the optical path of the pulsed laser beam entering the beam splitter 224 and the <001> axis is about 60 degrees, viewed from the <111> axis normal to the first and second surfaces. In other words, the beam splitter 224 may be arranged such that the optical path of the pulsed laser beam is parallel to the plane containing the <111> axis and the <010> axis.

4. Embodiment 1 (Light Beam Measurement Device)

4.1 Configuration

Figure 7A:
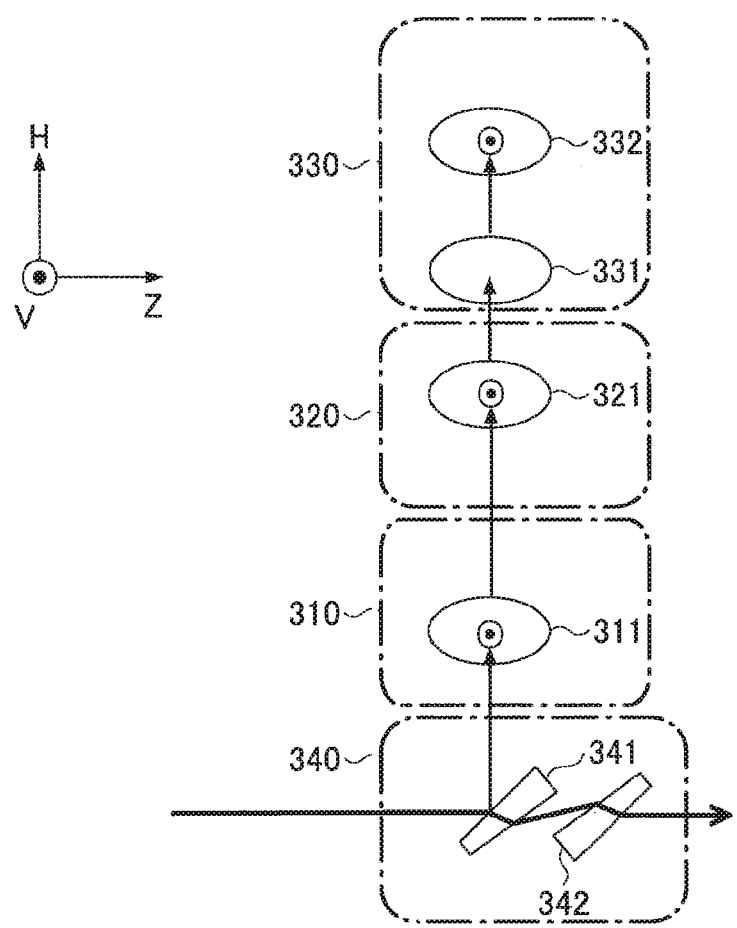
FIG. 7A is a structural drawing showing a light beam measurement device according to Embodiment 1.
Figure 7B:
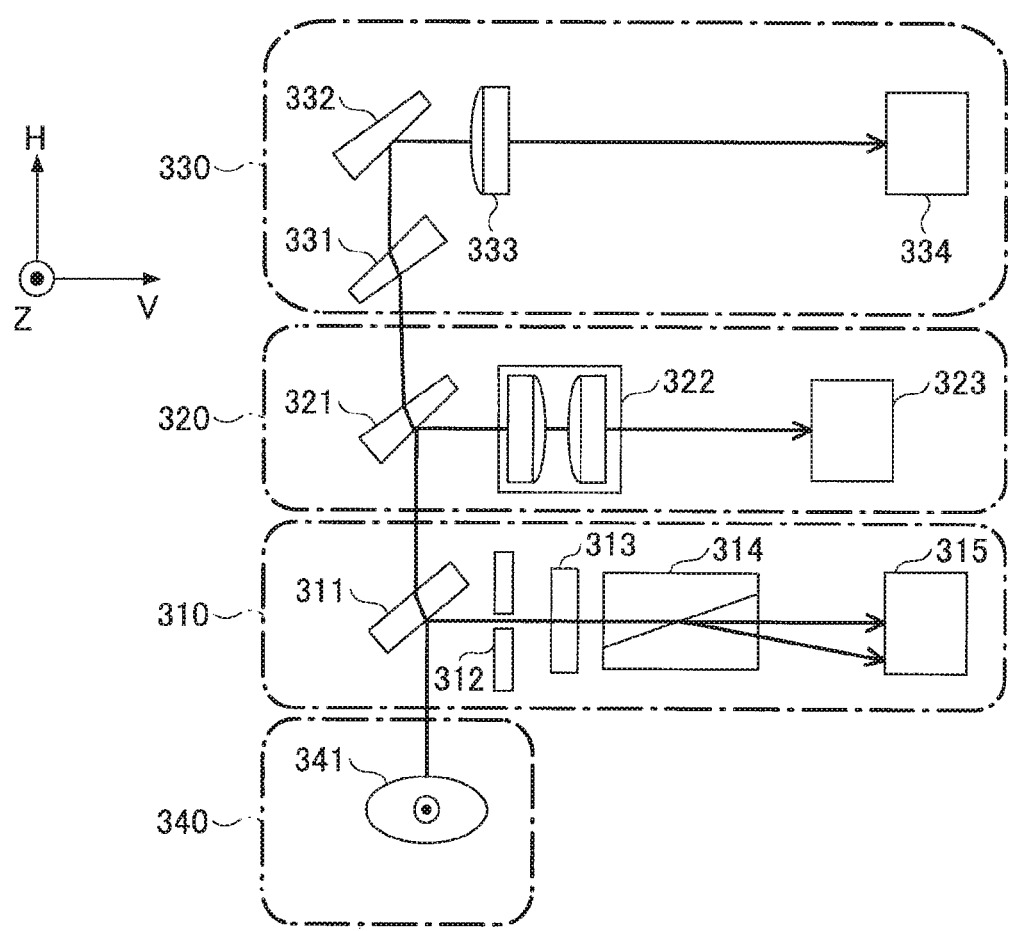
FIG. 7B is a structural drawing showing the light beam measurement device according to Embodiment 1.

Next, with reference to FIGS. 7A and 7B, the light beam measurement device 300 according to Embodiment 1 will be described. Here, 7A is a plan view showing the light beam measurement device 300, which is parallel to the H-Z plane. FIG. 7B is a plan view showing the light beam measurement device 300, which is parallel to the H-V plane. A coordinate axis shown in FIGS. 7A and 7B represents the direction of the pulsed laser beam traveling to the exposure apparatus.

The polarization measurement unit 310 may include a first measurement beam splitter 311, an aperture 312, an attenuation plate 313, a Rochon prism 314, and an image sensor 315.

The beam profile measurement unit 320 may include a second measurement beam splitter 321, a transfer optical system 322, and an image sensor 323.

The laser beam-directional stability measurement unit 330 may include a measurement cancel window 331, a third measurement beam splitter 332, a light focusing optical system 333 and an image sensor 334.

The first measurement beam splitter 311 may be provided on the optical path of the pulsed laser beam reflected by the separator beam splitter 341. The plane of incidence of the separator beam splitter 341 may be orthogonal to the plane of incidence of the first measurement beam splitter 311. In addition, the incident angle of the pulsed laser beam entering the first measurement beam splitter 311 may be 45 degrees.

In the polarization measurement unit 310, the aperture 312, the attenuation plate 313, the Rochon prism 314, and the image sensor 315 are arranged in this order on the optical path of the pulsed laser beam reflected by the first measurement beam splitter 311.

The second measurement beam splitter 321 may be provided on the optical path of the pulsed laser beam having transmitted through the first measurement beam splitter 311. In the beam profile measurement unit 320, the transfer optical system 322 and the image sensor 323 may be arranged in this order on the optical path of the pulsed laser beam reflected by the second measurement beam splitter 321. The second measurement beam splitter 321 may be a wedged substrate.

The measurement cancel window 331 formed by a wedged substrate may be provided on the optical path of the pulsed laser beam having transmitted through the second measurement beam splitter 321. In addition, the third measurement beam splitter 332 may be provided on the optical path of the pulsed laser beam having transmitted through the measurement cancel window 331. In the laser beam-directional stability measurement unit 330, the light focusing optical system 333 and the image sensor 334 may be arranged on the optical path of the pulsed laser beam reflected by the third measurement beam splitter 332.

The plane of incidence of the separator beam splitter 341 and the plane of incidence of the second measurement beam splitter 321 may be orthogonal to one another. The incident angle of the pulsed laser beam entering the second measurement beam splitter 321 may be 45 degrees.

The plane of incidence of the separator beam splitter 341 and the plane of incidence of the third measurement beam splitter 332 may be orthogonal to one another. The incident angle of the pulsed laser beam entering the third measurement beam splitter 332 may be 45 degrees.

Each of the first measurement beam splitter 311, the second measurement beam splitter 321, the measurement cancel window 331, and the third measurement beam splitter 332 may be made of a $CaF_2$ crystal. In addition, no dielectric multilayer for partially reflecting the pulsed laser beam may be formed on the first measurement beam splitter 311, the second measurement beam splitter 321, the measurement cancel window 331, and the third measurement beam splitter 332.

4.2 Operation

In the polarization measurement unit 310, the pulsed laser beam may be reflected by the first measurement beam splitter 311, the center of the reflected light beam may pass through the opening of the aperture 312, the amount of the pulsed laser beam having passed through the opening may be adjusted by the attenuation plate 313, and then the pulsed laser beam may enter the Rochon prism 314. The pulsed laser beam having entered the Rochon prism 314 may be split into the polarization component in the V-direction and the polarization component in the H-direction by the Rochon prism 314. The pulsed laser beam split into the polarization component in the V-direction and the polarization component in the H-direction by the Rochon prism 314 may be detected by the image sensor 315.

In the beam profile measurement unit 320, the pulsed laser beam reflected by the second measurement beam splitter 321 may enter the image sensor 323 via the transfer optical system 322, and be detected by the image sensor 323.

In the laser beam-directional stability measurement unit 330, the pulsed laser beam reflected by the third measurement beam splitter 332 may enter the image sensor 334 via the light focusing optical system 333, and be detected by the image sensor 334.

4.3 Effect

The plane of incidence of the separator beam splitter 341 and the plane of incidence of the first measurement beam splitter 311 may be orthogonal to one another. The pulsed laser beam may enter the separator beam splitter 341 and the first measurement beam splitter 311 at the same incident angle of 45 degrees. Therefore, due to the relationship of the reflective indexes between the P-polarization and the S-polarization, the degree of the polarization of the pulsed laser beam entering the separator beam splitter 341 and the degree of the polarization of the pulsed laser beam reflected by the first measurement beam splitter 311 are the same, and therefore the polarization state of the pulsed laser beam may be maintained.

In this way, the result of the measurement of the degree of polarization by the polarization measurement unit 310 may correspond to the degree of the polarization of the pulsed laser beam entering the separator beam splitter 341.

The structure of the polarization measurement unit 310 may not be limited to the above description. The Rochon prism 314, a light focusing optical system (not shown) and the image sensor 315 may be arranged on the optical path of the pulsed laser beam reflected by the first measurement beam splitter 311. The image sensor 315 may be an imaging device such as a CCD (charge coupled device), and be provided on the focal position of the light focusing optical system (not shown).

4.4 Measurement of Polarization

Figure 8:
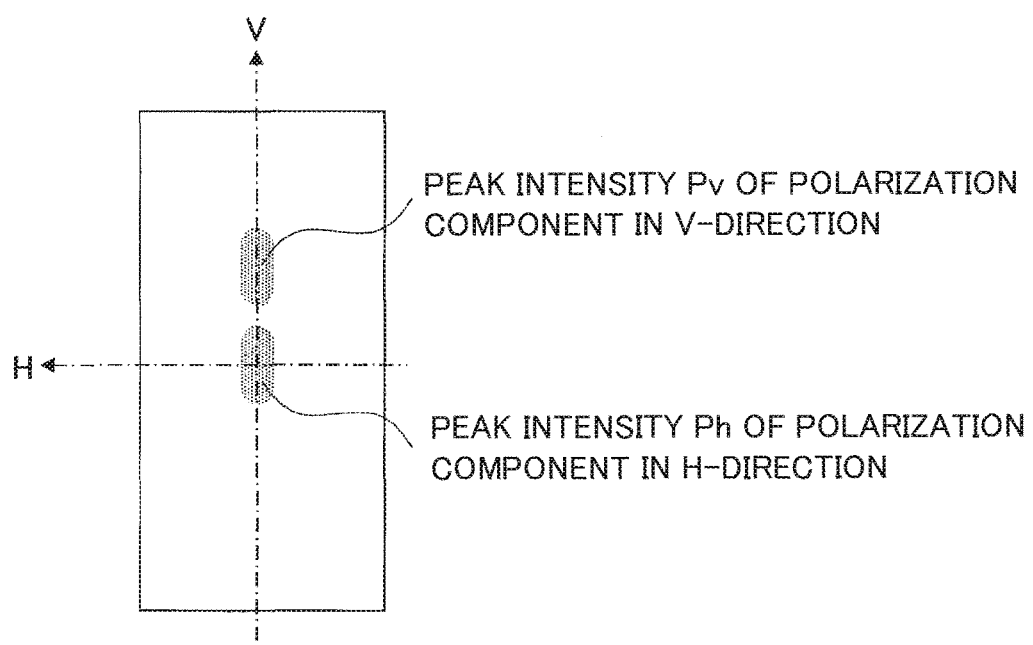
FIG. 8 is a drawing explaining measurement of polarization.

Next, with reference to FIG. 8, measurement of polarization by the polarization measurement unit 310 of the light beam measurement device 300 will be described. FIG. 8 shows the pulsed laser beam split into the polarization component in the V-direction and the polarization component in the H-direction detected by the image sensor 315 of the polarization measurement unit 310. As shown in FIG. 8, the image sensor 315 may detect a peak intensity Pv of the polarization component in the V-direction and a peak intensity Ph of the polarization component in the H-direction. Based on them, the degree of polarization P may be calculated according to the following equation (1).

$$P=(Ph-Pv)/(Ph+Pv) \quad (1)$$

Here, the degree of polarization P may be calculated by not only the method based on the peak intensities Pv and Ph, but also a method in which the value obtained by integrating the optical intensity of the polarization component in the V-direction and the value obtained by integrating the optical intensity of the polarization component in the H-direction are substituted for Ph and Pv, respectively.

4.5 Measurement of Beam Profile

Figure 9:
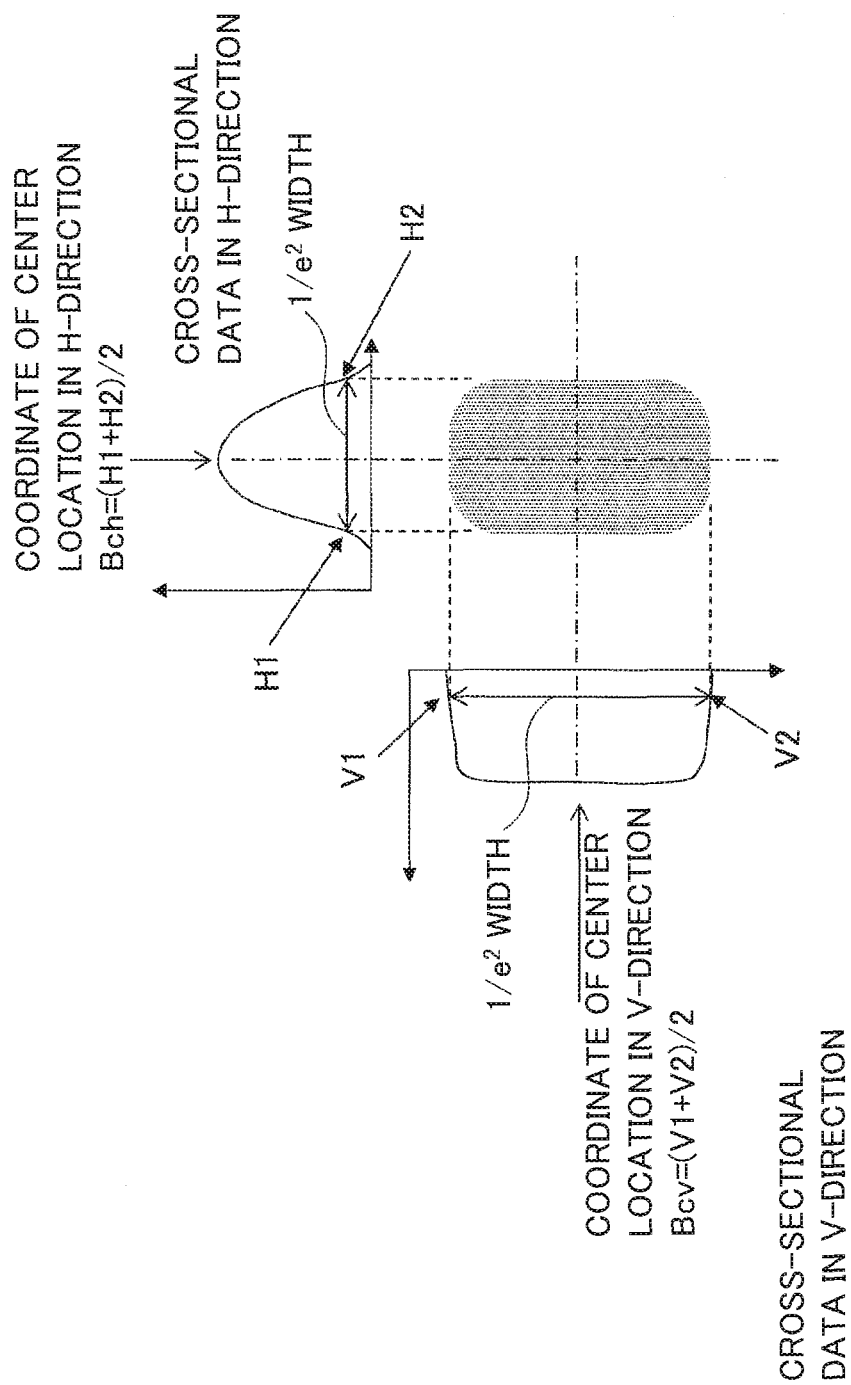
FIG. 9 is a drawing explaining measurement of a beam profile.

Next, with reference to FIG. 9, the measurement of a beam profile by the beam profile measurement unit 320 of the light beam measurement device 300 will be described. FIG. 9 shows the beam profile of the pulsed laser beam detected by the image sensor 323 of the beam profile measurement unit 320. V1 and V2 represent coordinates in the V-direction, where the optical intensity of the pulsed laser beam in the V-direction is $1/e^2$ of the peak intensity of the pulsed laser beam. In this case, a coordinate Bcv of the center location of the light beam in the V-direction may be calculated according to the following equation (2).

$$Bcv=(V1+V2)/2 \quad (2)$$

Meanwhile, H1 and H2 represent coordinates in the H-direction, where the optical intensity of the pulsed laser beam in the H-direction is $1/e^2$ of the peak intensity of the pulsed laser beam. In this case, a coordinate Bch of the center location of the pulsed laser beam in the H-direction may be calculated according to the following equation (3).

$$Bch=(H1+H2)/2 \quad (3)$$

Here, the coordinates Bch and Bcv of the center location of the beam profile may be obtained by calculating the location of the center of gravity, based on the image data detected by the image sensor 323 of the beam profile measurement unit 320. In addition, each of a beam width Bwh in the H-direction and a beam width Bwv in the V-direction may be calculated as the width of the region in which the optical intensity is equal to or greater than a predetermined ratio (e.g., 5% to 10%) to the peak value.

4.6 Measurement of Stability in Traveling Direction of Laser Beam

Figure 10:
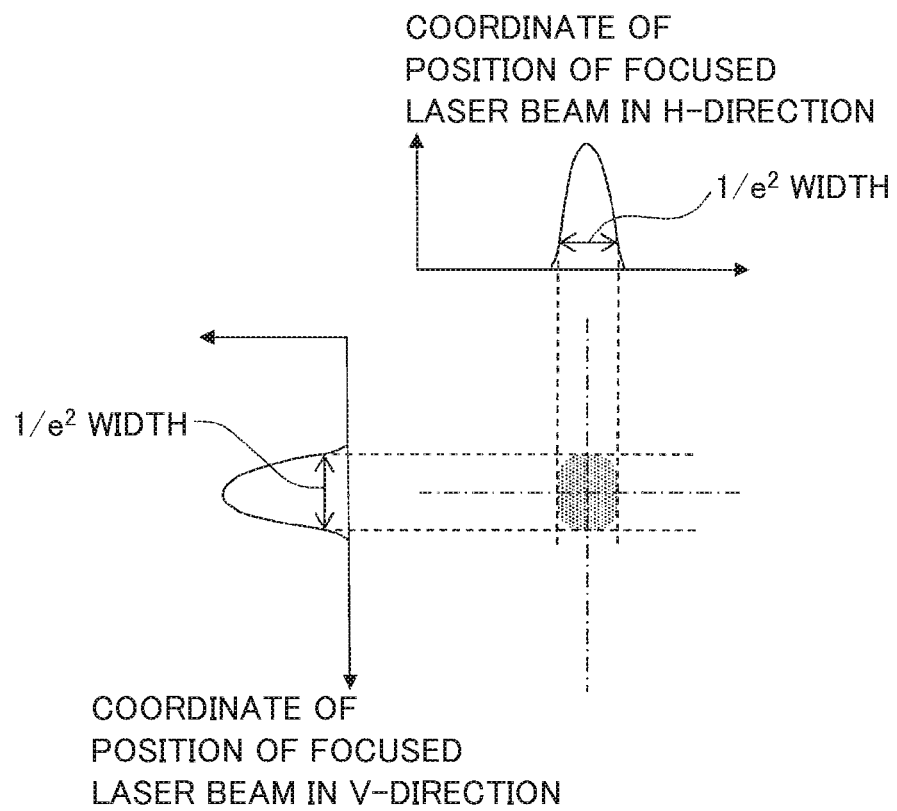
FIG. 10 is a drawing explaining measurement of the stability in the traveling direction of a laser beam.

Next, with reference to FIG. 10, the measurement of the stability in the traveling direction of a pulsed laser beam by the laser beam-directional stability measurement unit 330 of the light beam measurement device 300 will be described. FIG. 10 is an image showing the stability in the traveling direction of the pulsed laser beam, which is detected by the image sensor 334 of the laser beam-directional stability measurement unit 330.

Each of a stability Bph in the traveling direction of the pulsed laser beam in the H-direction and a stability Bpv in the traveling direction of the pulsed laser beam in the V-direction may be obtained by calculating the location of the center of gravity, based on the image data detected by the image sensor 334 of the laser beam-directional stability measurement unit 330. In addition, each of a beam divergence Bdh in the H-direction and a beam divergence Bdv in the V-direction may be calculated as the width of the region in which the optical intensity is equal to or greater than a predetermined ratio (for example, $1/e^2$, or 5% to 10%) to the peak value.

5. Embodiment 2 (Light Beam Measurement Device)

Figure 11:
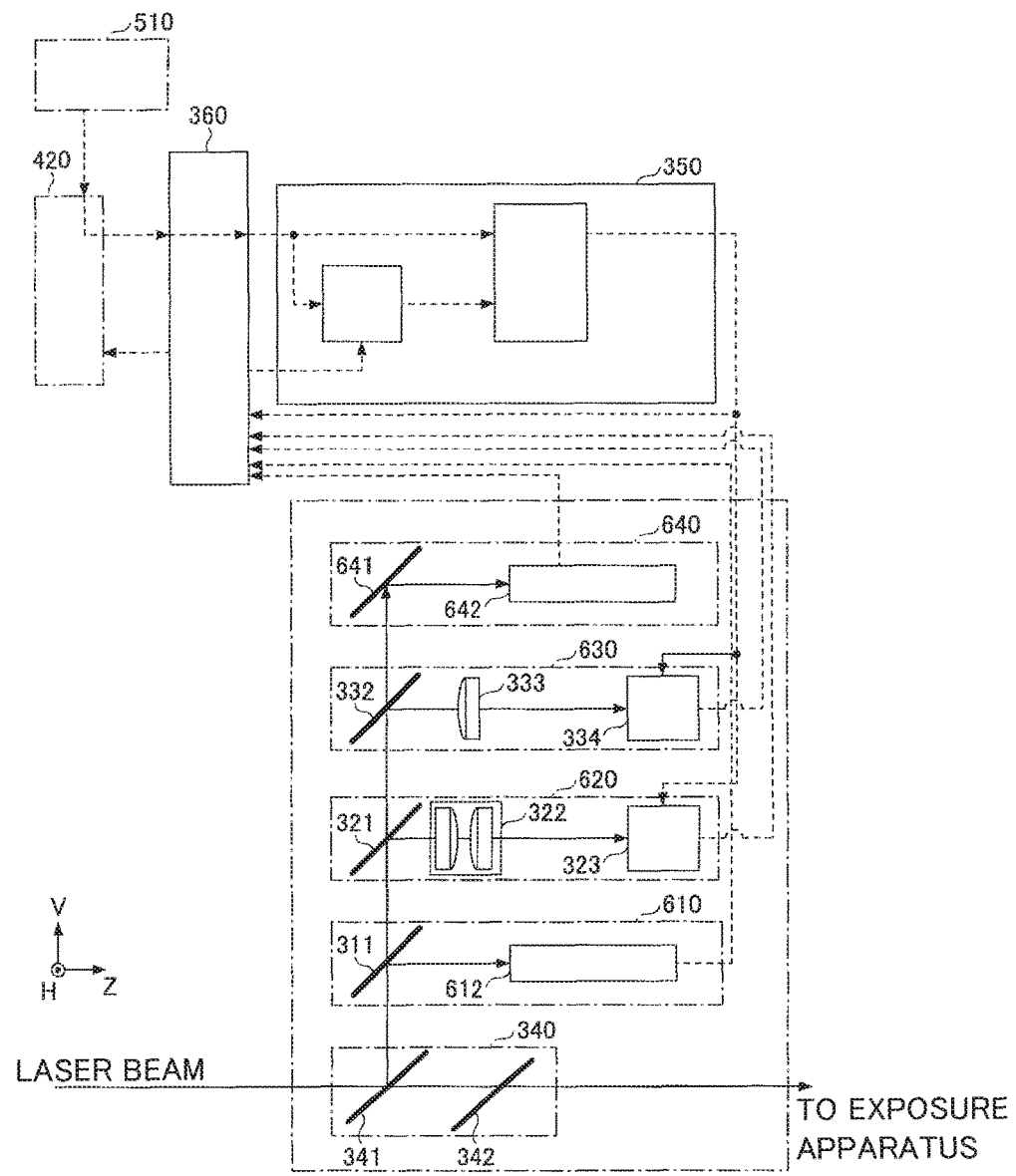
FIG. 11 is a drawing explaining a light beam measurement device according to Embodiment 2.
Figure 12A:
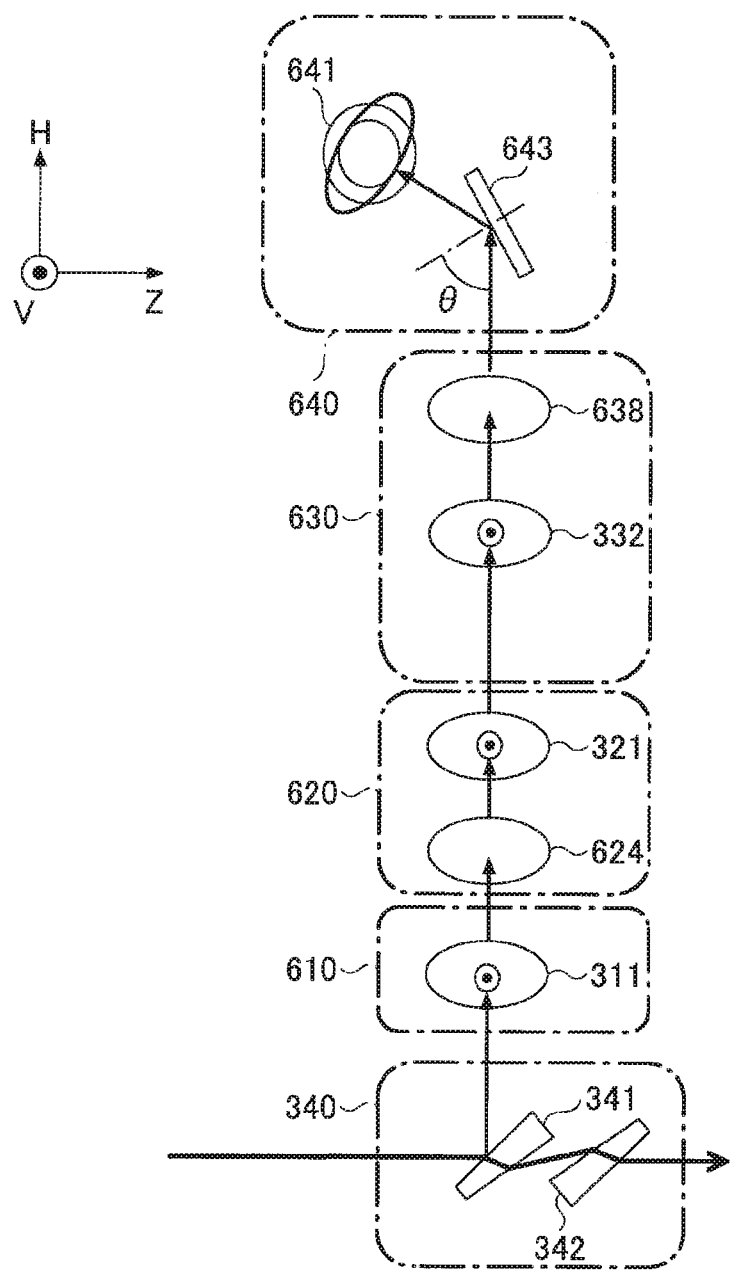
FIG. 12A is a structural drawing showing the light beam measurement device according to Embodiment 2.
Figure 12B:
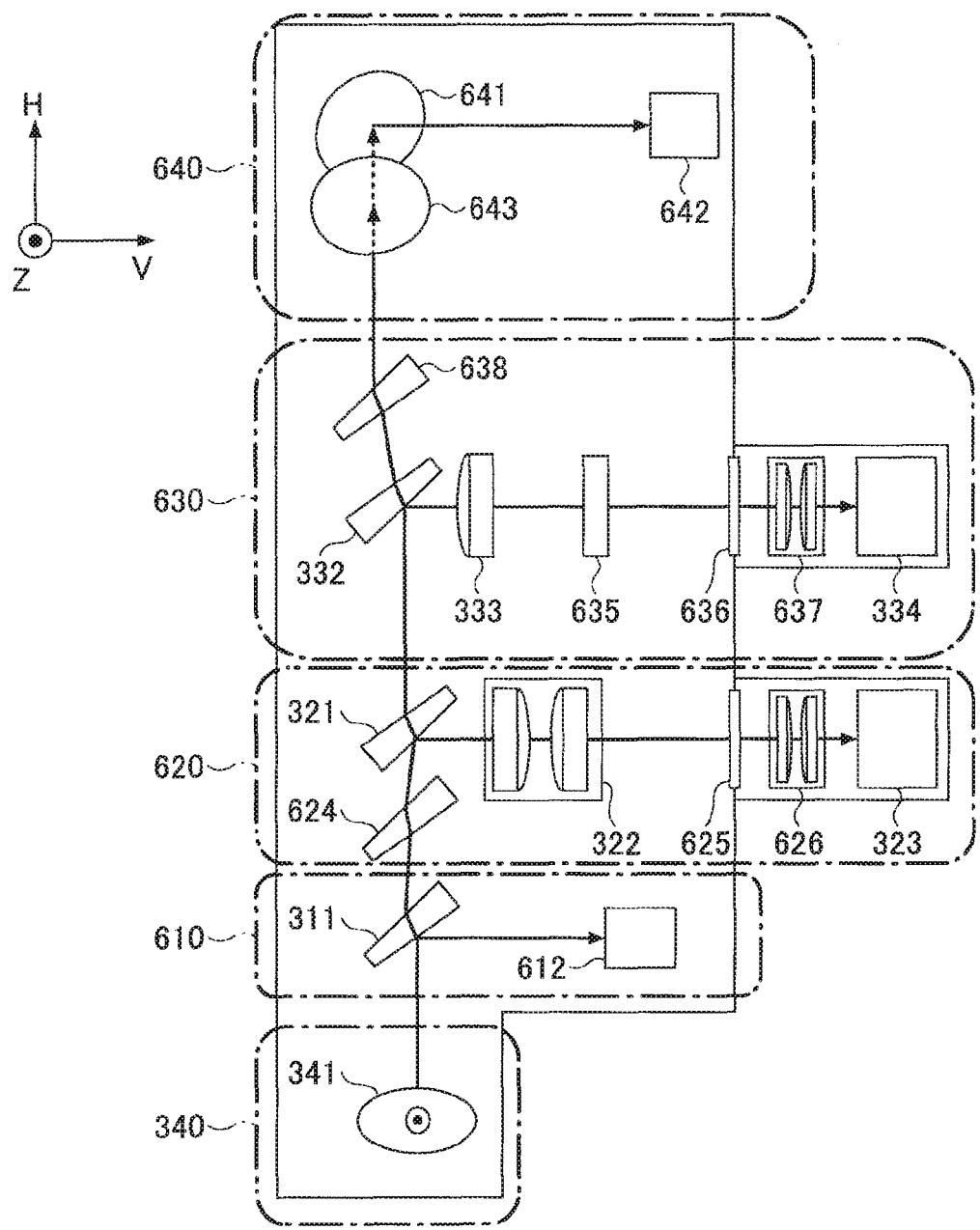
FIG. 12B is a structural drawing showing the light beam measurement device according to Embodiment 2.

Next, with reference to FIGS. 11, 12A and 12B, the light beam measurement device according to Embodiment 2 will be described. Here, FIG. 11 is a schematic diagram showing the light beam measurement device according to Embodiment 2, where part of the components is omitted. FIG. 12A is a plan view showing the light beam measurement device according to the present embodiment, which is parallel to the H-Z plane. FIG. 12B is a plane view showing the light beam measurement device according to the present embodiment, which is parallel to the H-V plane. In addition, a coordinate axis shown in each of the FIGS. 11, 12A and 12B represents the direction of the pulsed laser beam traveling to the exposure apparatus. Here, the light beam measurement device according to the present embodiment may be replaced with the light beam measurement device 300 according to Embodiment 1 shown in FIG. 1 and so forth.

The light beam measurement device according to the present embodiment may include a first polarization measurement unit 610, a beam profile measurement unit 620, a laser beam-directional stability measurement unit 630, a second polarization measurement unit 640, the light beam separator 340, the controller 350, and the beam measurement controller 360.

The first polarization measurement unit 610 may be provided on the optical path of the pulsed laser beam reflected by the separator beam splitter 341 of the light beam separator 340. The first polarization measurement unit 610 may include the first measurement beam splitter 311, and a first energy sensor 612. All of the pulsed laser beam reflected by the first measurement beam splitter 311 may enter the first energy sensor 612.

The beam profile measurement unit 620 may be provided on the optical path of the pulsed laser beam having transmitted through the first measurement beam splitter 311. The beam profile measurement unit 620 may include a cancel window 624, the second measurement beam splitter 321, the transfer optical system 322, the image sensor 323, a fluorescent screen 625, and a transfer optical system 626. The pulsed laser beam having transmitted through the first measurement beam splitter 311 may transmit through the cancel window 624, and be reflected by the second measurement beam splitter 321. The pulsed laser beam having been reflected by the second measurement beam splitter 321 may enter the image sensor 323 via the transfer optical system 322, the fluorescent screen 625, and the transfer optical system 626.

The laser beam-directional stability measurement unit 630 may be provided on the optical path of the pulsed laser beam having transmitted through the second measurement beam splitter 321. The laser beam-directional stability measurement unit 630 may include the third measurement beam splitter 332, the light focusing optical system 333, the image sensor 334, an attenuation plate 635, a fluorescent screen 636, a transfer optical system 637, and a cancel window 638. The pulsed laser beam having transmitted through the second measurement beam splitter 321 may be reflected by the third measurement beam splitter 332. The pulsed laser beam having been reflected by the third measurement beam splitter 332 may enter the image sensor 334 via the light focusing optical system 333, the attenuation plate 635, the fluorescent screen 636, and the transfer optical system 637. The pulsed laser beam having transmitted through the third measurement beam splitter 332 may enter the cancel window 638.

The second polarization measurement unit 640 may be provided on the optical path of the pulsed laser beam having passed through the third measurement beam splitter 332. The second polarization measurement unit 640 may include a mirror 641, a second energy sensor 642 and a polarizer 643. The polarizer 643 may reflect the polarization component in the H-direction and allow the polarization component in the V-direction to highly transmit therethrough.

The separator beam splitter 341 and the polarizer 643 may be arranged such that the plane of incidence of the pulsed laser beam on the separator beam splitter 341 and the plane of incidence of the pulsed laser beam on the polarizer 643 are approximately the same plane. The polarizer 643 may be provided such that an incident angle θ of the pulsed laser beam is the Brewster's angle. The mirror 641 may be made of synthetic silica, and have a high-reflection coating formed thereon for highly reflecting the pulsed laser beam. All of the pulsed laser beam having been reflected by the mirror 641 may enter the second energy sensor 642.

Each of the first energy sensor 612 and the second energy sensor 642 may include ground glass to diffuse the pulsed laser beam and a photodiode. The pulsed laser beam diffused by the ground glass may be detected by the photodiode. The first energy sensor 612 and the second energy sensor 642 may include pyroelectric elements.

In the first polarization measurement unit 610, the first energy sensor 612 may measure the intensity of the entire pulse energy of the pulsed laser beam including the polarization component in the H-direction and the polarization component in the V-direction.

In the second polarization measurement unit 640, the second energy sensor 642 may measure the value proportional to the intensity of the pulse energy of the pulsed laser beam including the polarization component in the H-direction.

The intensity of the pulse energy detected by the first energy sensor 612 and the intensity of the pulse energy detected by the second energy sensor 642 may be sent to the beam measurement controller 360.

6. Measurement Method by Light Beam Measurement Device

6.1 Light Beam Measurement Method by Light Beam Measurement Device According to Embodiment 1

Figure 13:
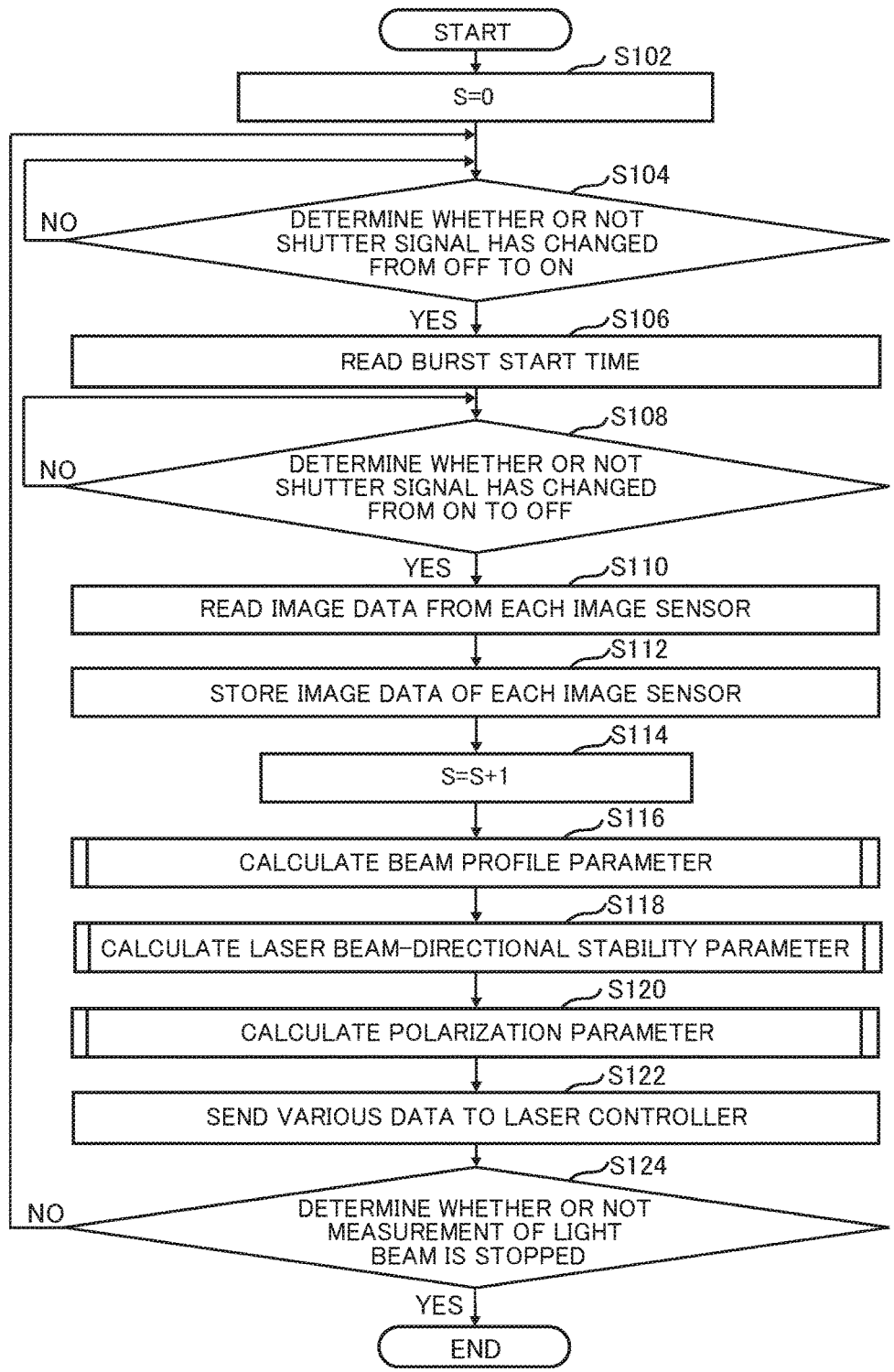
FIG. 13 is a flowchart of a measurement method by the light beam measurement device according to Embodiment 1.

Next, with reference to FIG. 13, the method of measuring a light beam by the light beam measurement device according to Embodiment 1 will be described.

First, in step S102, a burst number S may be set to 0. The burst number S means the order of a group of consecutive pulsed laser beams along the time axis when the pulsed laser beams are emitted, and begins at 1. Here, before the start of a burst, the burst number S may be set to the initial value 0.

Next, in step S104, whether or not a shutter signal has changed from off to on may be determined. When the shutter signal has changed from off to on, the step may move to step S106. On the other hand, when the shutter signal has not changed from off to on, the step S104 may be repeated.

Next, in the step S106, the burst start time may be read.

Next, in step S108, whether or not the shutter signal has changed from on to off may be determined. When the shutter signal has changed from on to off, the step may move to step S110. On the other hand, when the shutter signal has not changed from on to off, the step S108 may be repeated.

Next, in the step S110, image data may be obtained by the image sensor 315 of the polarization measurement unit 310, the image sensor 323 of the beam profile measurement unit 320 and the image sensor 334 of the laser beam-directional stability measurement unit 330.

Next, in step S112, the image data acquired by the image sensor 315, the image sensor 323, and the image sensor 334 may be stored in a storage part (not shown) of the beam measurement controller 360. In this case, the burst start time read in the step S106 may also be stored.

Next, in step S114, a new burst number S may be set by adding 1 to the current burst number S.

Next, in step S116, a beam profile parameter may be calculated. To be more specific, a subroutine for calculating the beam profile parameter described later may be performed.

Next, in step S118, a laser beam-directional stability parameter may be calculated. To be more specific, a subroutine for calculating the laser beam-directional stability parameter described later may be performed.

Next, in step S120, a polarization parameter may be calculated. To be more specific, a subroutine for calculating the polarization parameter described later may be performed.

Next, in step S122, various data, that is, the burst start time, the burst number S, and, the calculated beam profile parameter, laser beam-directional stability parameter, and polarization parameter may be sent to the laser controller 420.

Next, in step S124, whether or not the measurement of the light beam is stopped may be determined. When the measurement of the light beam is not stopped, the step may move back to the step 104. On the other hand, when the measurement of the light beam is stopped, the process may be ended.

By this means, it is possible to perform the measurement of the light beam by the light beam measurement device according to Embodiment 1.

Figure 14:
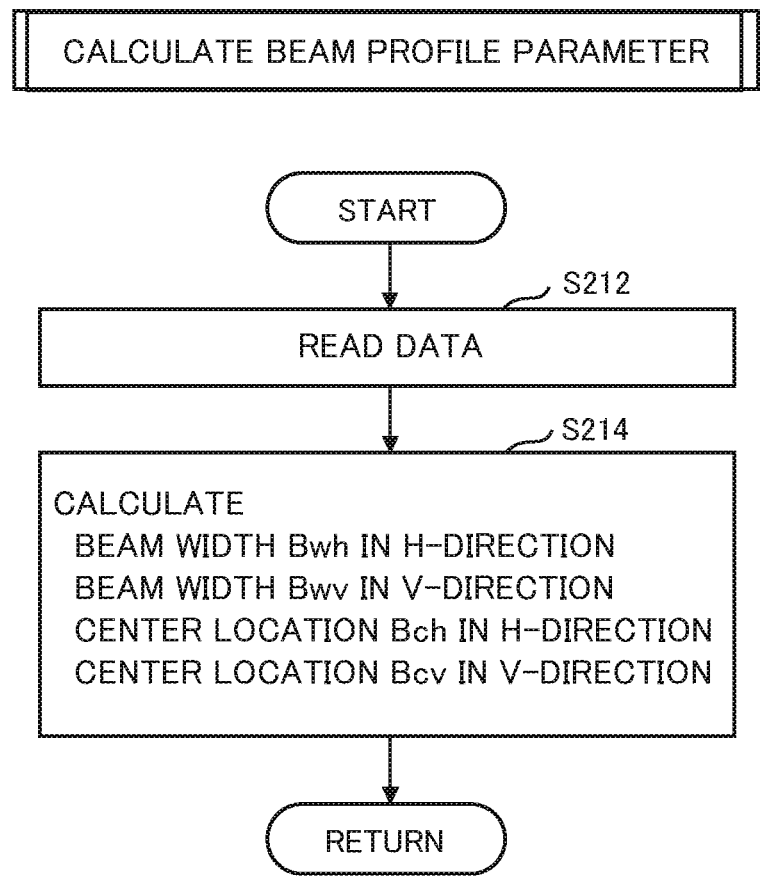
FIG. 14 is a flowchart of a subroutine for calculating a beam profile parameter.

Next, with reference to FIG. 14, the subroutine for calculating the beam profile parameter in the step 116 shown in FIG. 13 will be described.

First, in step S212, the image data detected by the image sensor 323 of the beam profile measurement unit 320, which is stored in the storage part (not shown) of the beam measurement controller 360, may be read in a computing part (not shown).

Next, in step S214, the beam profile parameter may be calculated by the computing part (not shown) of the beam measurement controller 360. To be more specific, the beam width Bwh in the H-direction, the beam width Bwv in the V-direction, the center location Bch in the H-direction, and the center location Bcv in the V-direction may be calculated based on the image data detected by the image sensor 323 of the beam profile measurement unit 320. After that, the process may return to the main routine shown in FIG. 13.

Figure 15:
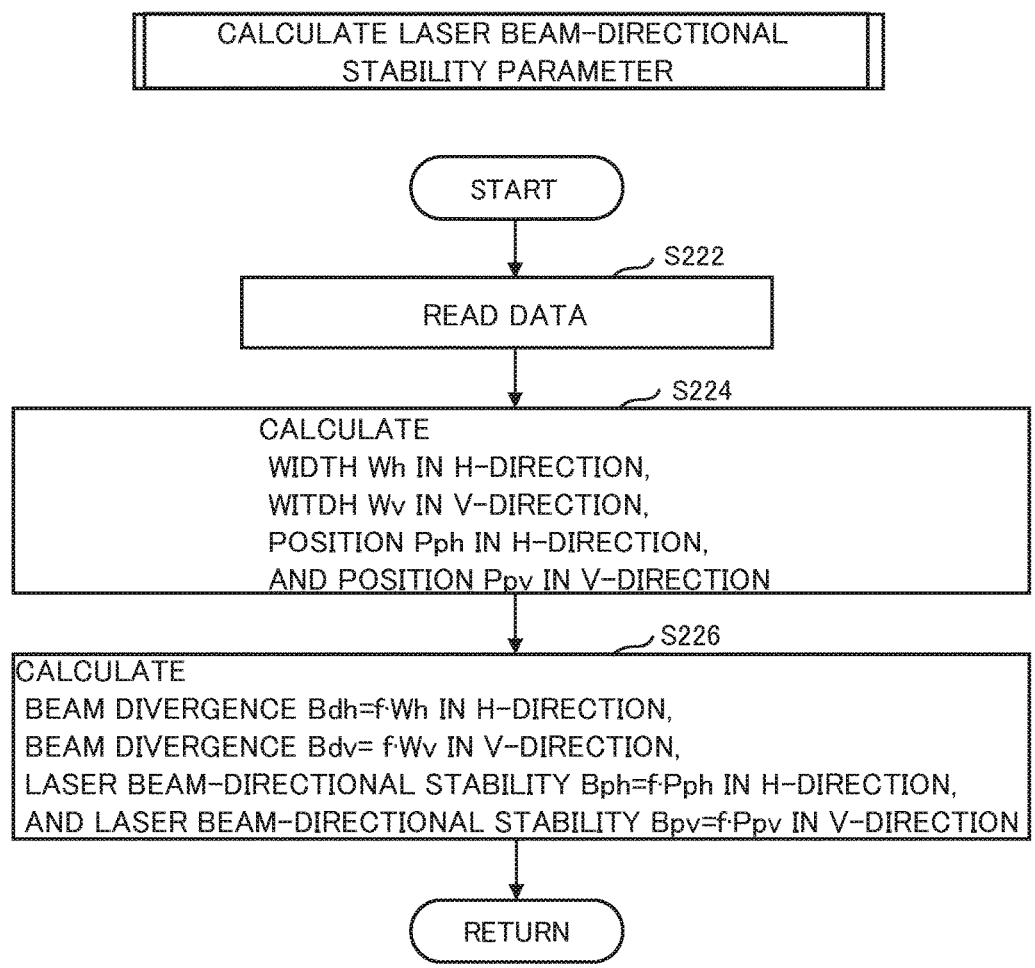
FIG. 15 is a flowchart of a subroutine for calculating a laser beam-directional stability parameter.

Next, with reference to FIG. 15, the subroutine for calculating the laser beam-directional stability parameter in the step 118 shown in FIG. 13 will be described.

First, in step S222, the image data detected by the image sensor 334 of the laser beam-directional stability measurement unit 330, which is stored in the storage part (not shown) of the beam measurement controller 360, may be read in a computing part (not shown).

Next, in step S224, the width and the position of the light beam used for calculating the laser beam-directional stability parameter may be calculated by the computing part (not shown) of the beam measurement controller 360. To be more specific, the width in the H-direction Wh, the width in the V-direction Wv, the position in the H-direction Pph, and the position in the V-direction Ppv may be calculated based on the image data detected by the image sensor 334 of the laser beam-directional stability measurement unit 330.

Next, in step S226, the laser beam-directional stability parameter may be calculated by the computing part (not shown) of the beam measurement controller 360. To be more specific, the beam divergence in the H-direction Bdh=f·Wh, and the beam divergence in the V-direction Bdv=f·Wv may be calculated based on the widths Wh and Wv calculated in the step S224. In addition, the laser beam-directional stability in the H-direction Bph=f·Pph, and the laser beam-directional stability in the V-direction Bpv=f·Ppv may be calculated based on the positions Pph and Ppv. Here, f represents a focal distance. After that, the process may return to the main routine shown in FIG. 13.

Figure 16:
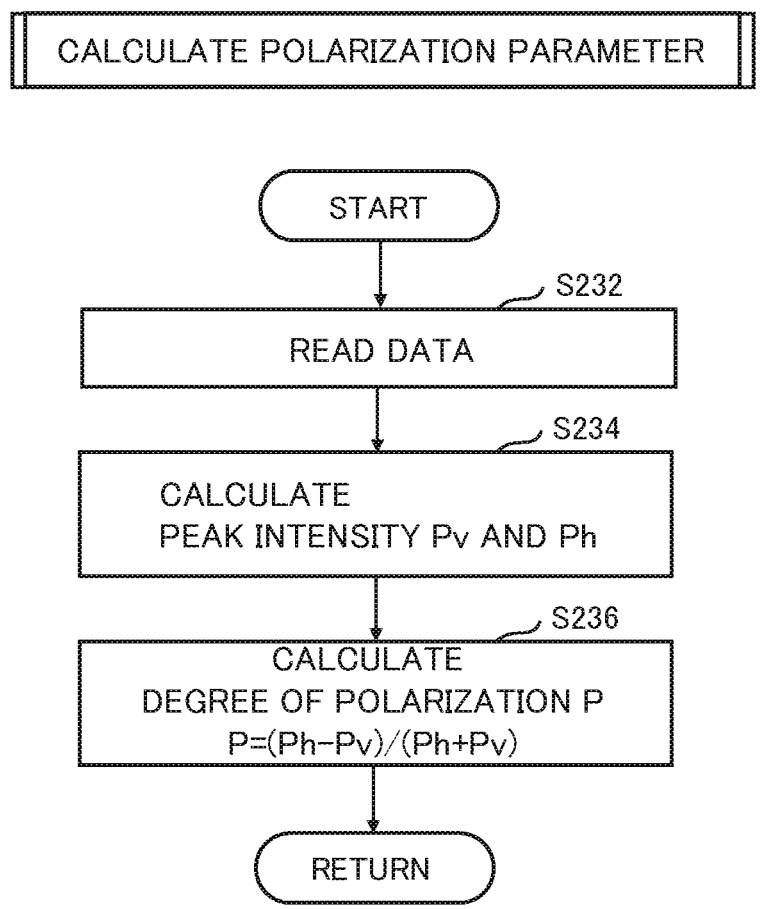
FIG. 16 is a flowchart of a subroutine for calculating a polarization parameter.

Next, with reference to FIG. 16, the subroutine for calculating the polarization parameter in the step S120 shown in FIG. 13 will be described.

First, in step S232, the image data detected by the image sensor 315 of the polarization measurement unit 310, which is stored in the storage part (not shown) of the beam measurement controller 360, may be read in a computing part (not shown).

Next, in step S234, the peak intensity Pv of the S-polarization component and the peak intensity Ph of the P-polarization component used for calculating the degree of polarization may be calculated by the computing part (not shown) of the beam measurement controller 360. To be more specific, the peak intensity Pv of the S-polarization component and the peak intensity Ph of the P-polarization component may be calculated based on the image data detected by the image sensor 315 of the polarization measurement unit 310.

Next, in step S236, the degree of polarization P may be calculated by the computing part (not shown) of the beam measurement controller 360. To be more specific, the degree of polarization P may be calculated based on the peak intensity Pv of the S-polarization component and the peak intensity Ph of the P-polarization component calculated in the step 234, according to the above-described equation (1). After that, the process may return to the main routine shown in FIG. 13.

6.2 Light Beam Measurement Method by Light Beam Measurement Device According to Embodiment 2

Figure 17:
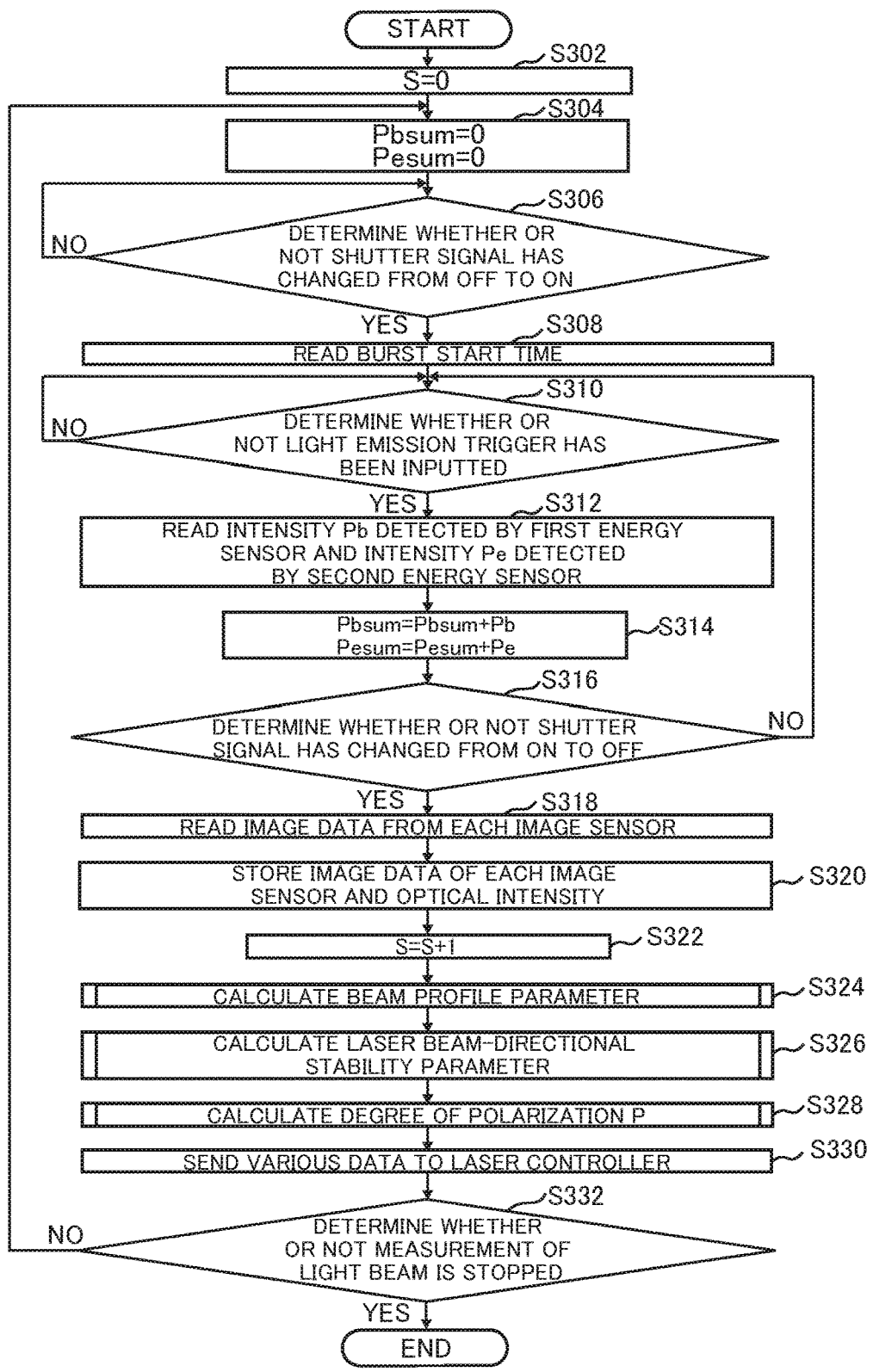
FIG. 17 is a flowchart of a measurement method by the light beam measurement device according to Embodiment 2.

Next, with reference to FIG. 17, the light beam measurement method by the light beam measurement device according to Embodiment 2 will be described.

First, in step S302, the burst number S may be set to 0. The burst number S means the order of a group of pulsed laser beams along the time axis when the pulsed laser beams are emitted, and begins at 1. Here, before the start of a burst, the burst number S may be set to the initial value 0.

Next, in step S304, optical intensity integrated values Pbsum and Pesum may be set to 0. Here, the optical intensity integrated value Pbsum may be the integrated value of an optical intensity Pb detected by the first energy sensor 612.

Meanwhile, the optical intensity integrated value Pesum may be the integrated value of an optical intensity Pe detected by the second energy sensor 642.

Next, in step S306, whether or not a shutter signal has changed from off to on may be determined. When the shutter signal has changed from off to on, the step may move to step S308. On the other hand, when the shutter signal has not changed from off to on, the step S306 may be repeated.

Next, in the step S308, the burst start time may be read.

Next, in step S310, whether or not a light emission trigger signal has been inputted may be determined. When it is determined that a light emission trigger signal has been inputted, the step may move to step S312. On the other hand, when it is determined that a light emission trigger signal has not been inputted, the step 310 may be repeated.

Next, in step S312, the pulse energy intensity Pb detected by the first energy sensor 612 and the pulse energy intensity Pe detected by the second energy sensor 642 may be read in the beam measurement controller 360.

Next, in step S314, the computing part (not shown) of the beam measurement controller 360 may add the pulse energy intensity Pb read in the step 312 to the current optical intensity integrated value Pbsum to make a new optical intensity integrated value Pbsum. Likewise, the pulse energy intensity Pe read in the step 312 may be added to the current optical intensity integrated value Pesum to make a new optical intensity integrated value Pesum.

Next, in step S316, whether or not the shutter signal has changed from on to off may be determined. When the shutter signal has changed from on to off, the step may move to step S318. On the other hand, when the shutter signal has not changed from on to off, the step may move to step S310.

Next, in step S318, image data may be acquired by the image sensor 323 of the beam profile measurement unit 620 and the image sensor 334 of the laser beam-directional stability measurement unit 630.

Next, in step S320, the optical intensity integrated values Pbsum and Pesum, and the image data acquired by the image sensor 323 and the image sensor 334 may be stored in the storage part (not shown) of the beam measurement controller 360. In this case, the burst start time read in the step S308 may also be stored.

Next, in step S322, a new burst number S may be set by adding 1 to the current burst number S.

Next, in step S324, the beam profile parameter may be calculated. To be more specific, a subroutine for calculating the beam profile parameter shown in FIG. 14 may be performed.

Next, in step S326, the laser beam-directional stability parameter may be calculated. To be more specific, a subroutine for calculating the laser beam-directional stability parameter shown in FIG. 15 may be performed.

Next, in step S328, the degree of polarization P may be calculated. To be more specific, the subroutine for calculating the degree of polarization P described later may be performed.

Next, in step S330, various data, that is, the burst start time, the burst number S, the calculated beam profile parameter, the laser beam-directional stability parameter, and the polarization parameter may be sent to the laser controller 420.

Next, in step S332, whether or not the measurement of the light beam is stopped may be determined. When the measurement of the light beam is not stopped, the step may move back to the step 304. On the other hand, when the measurement of the light beam is stopped, the process may be ended.

As described above, the light beam measurement method by the light beam measurement device according to Embodiment 2 can be performed.

Figure 18:
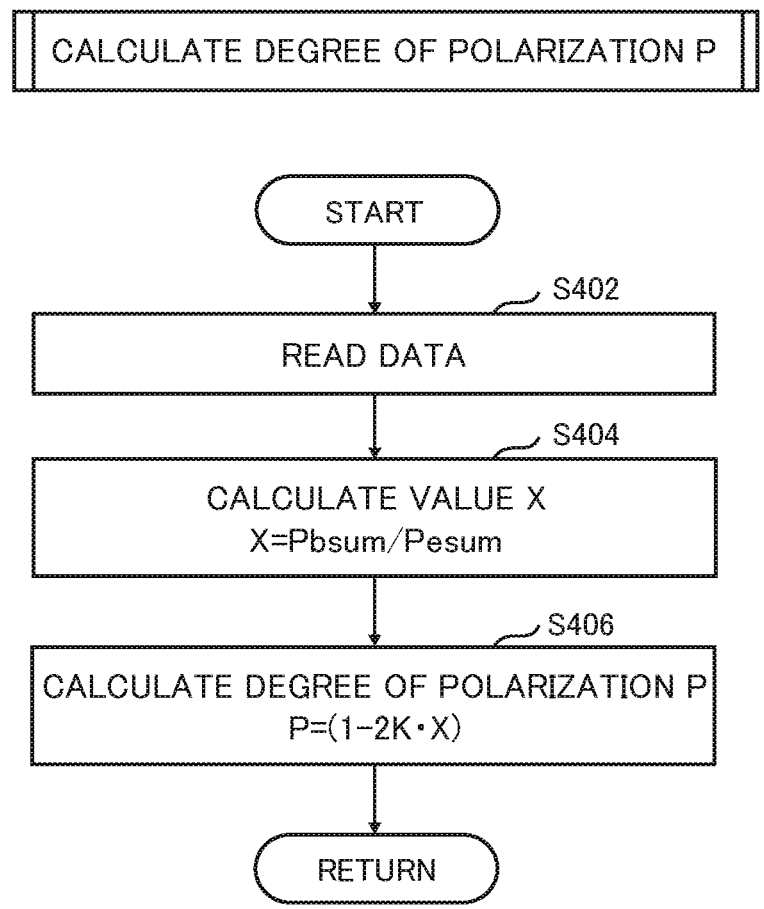
FIG. 18 is a flowchart of a subroutine for calculating a degree of polarization.

Next, with reference to FIG. 18, a subroutine for calculating the degree of polarization P in the step 328 shown in FIG. 17 will be described.

First, in step S402, the optical intensity integrated value Pbsum detected by the first energy sensor 612 and the optical intensity integrated value Pesum detected by the second energy sensor 642, which are stored in the storage part (not shown), may be read in the computing part (not shown). The storage part (not shown) and the computing part (not shown) may be provided in the beam measurement controller 360.

Next, in step S404, the computing part (not shown) of the beam measurement controller 360 may calculate a value X to be used for calculating the degree of polarization P, based on the optical intensity integrated value Pbsum and the optical intensity integrated value Pesum. To be more specific, the value X may be calculated according to the following equation.

$$X = Pb\text{sum}/Pe\text{sum}$$

Next, in step S406, the computing part (not shown) of the beam measurement controller 360 may calculate the degree of polarization P, based on the value X calculated in the step S404. To be more specific, the degree of polarization P may be calculated according to the following equation.

$$P = (1 - 2K \cdot X)$$

Figure 19:
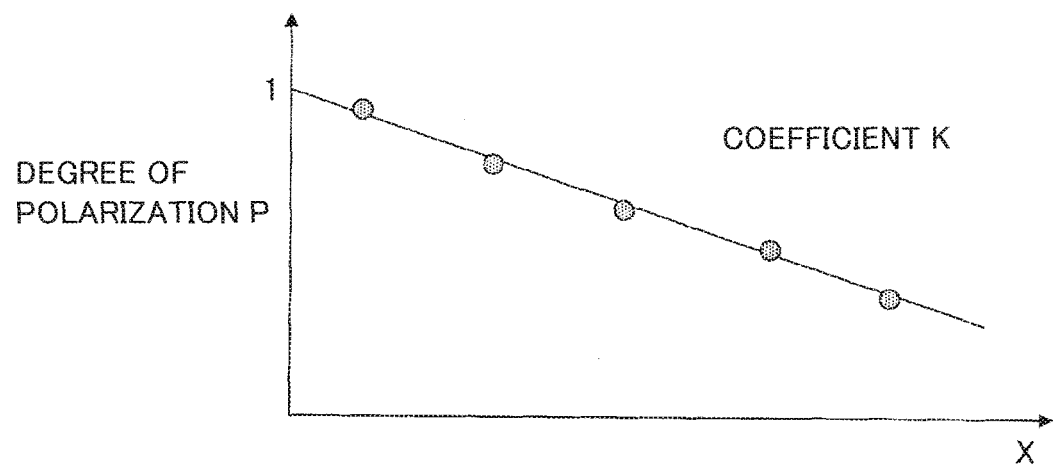
FIG. 19 is a drawing explaining a subroutine for calculating a degree of polarization.

Here, K represents a coefficient, and may be calculated in advance by measuring the relationship between the value X and the degree of polarization P, as shown in FIG. 19. After that, the process may return to the main routine shown in FIG. 17.

7. Embodiment 3 (Laser Apparatus)

Figure 20:
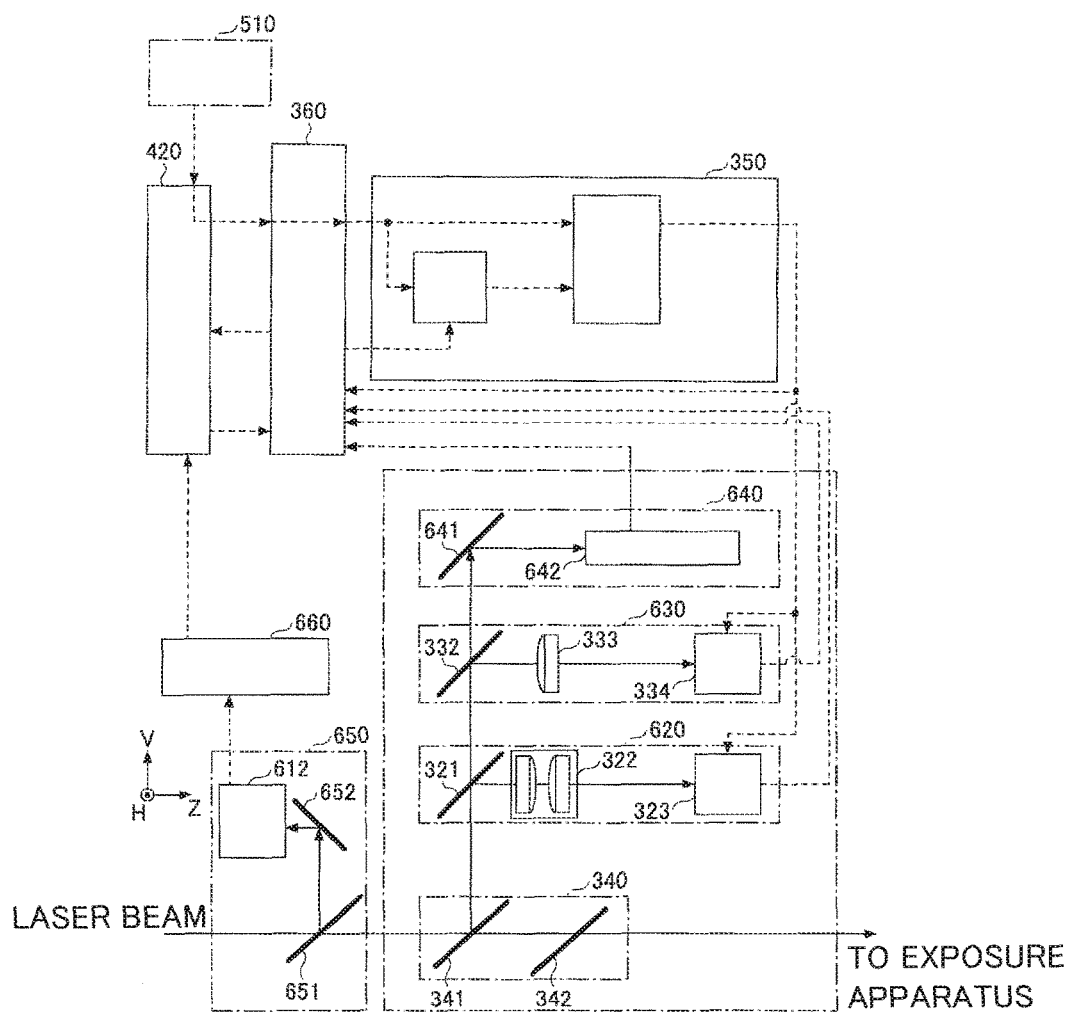
FIG. 20 is a drawing explaining a laser apparatus according to Embodiment 3.

Next, with reference to FIG. 20, the laser apparatus according to Embodiment 3 will be described. The present embodiment is different from Embodiment 2 in that the first polarization measurement unit is provided outside the light beam measurement device and in the upstream side of the light beam separator 340. Here, a coordinate axis shown in FIG. 20 represents the direction of the pulsed laser beam traveling to the exposure apparatus.

To be more specific, with the present embodiment, the light beam measurement device may include the beam profile measurement unit 620, the laser beam-directional stability measurement unit 630, and the second polarization measurement unit 640. The first polarization measurement unit 650 may be provided in the upstream side of the light beam separator 340 of the light beam measurement device, on the optical path of the pulsed laser beam.

The first polarization measurement unit 650 may include a beam splitter 651, a mirror 652 and the first energy sensor 612. The pulsed laser beam having entered the beam splitter 651 is partially reflected by the beam splitter 651, and then the reflected part of the pulsed laser beam may be reflected by the mirror 652 and enter the first energy sensor 612. Then, the pulse energy of the pulsed laser beam having entered the first energy sensor 612 may be measured by the first energy sensor 612. The value of the measured pulse energy may be sent to the energy controller 660, and then, sent to the beam measurement controller 360 via the laser controller 420.

Meanwhile, the pulsed laser beam having transmitted through the beam splitter 651 may be reflected by the separator beam splitter 341 of the light beam separator 340.

The pulsed laser beam reflected by the separator beam splitter 341 may be measured by the beam profile measurement unit 620, the laser beam-directional stability measurement unit 630 and the second polarization measurement unit 640.

8. Controller

Figure 21:
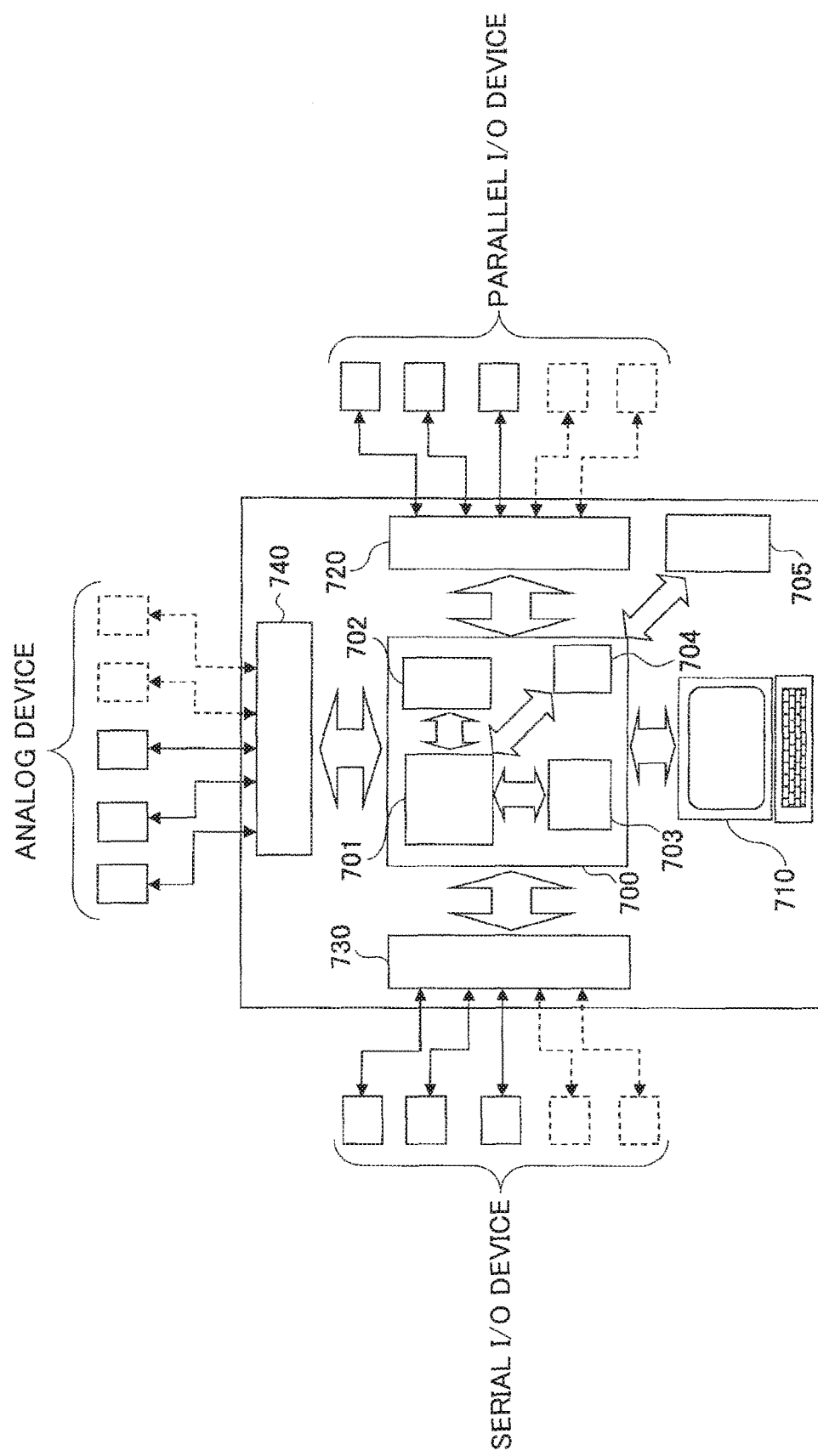
FIG. 21 is a drawing explaining controllers.

Next, with reference to FIG. 21, the controllers such as the laser controller 420 of the laser apparatus of the present disclosure will be described.

Each of the controllers such as the laser controller 420 may be constituted by general-purpose control equipment such as a computer and a programmable controller. For example, each of the controllers may be constituted as follows.

The controller may include a processor 700, and a storage memory 705, a user interface 710, a parallel I/O controller 720, a serial I/O controller 730, and an A/D and D/A converter 740 which are connected to the processor 700. The processor 700 may include a CPU 701, and a memory 702, a timer 703 and a GPU 704 which are connected to the CPU 701.

The processor 700 may read out a program stored in the storage memory 705. In addition, the processor 700 may execute the read program, read out data from the storage memory 705 according to the execution of the program, and store the data in the storage memory 705.

The parallel I/O controller 720 may be connected to a device that allows communication via a parallel I/O port. The parallel I/O controller 720 may control the communication by digital signals via the parallel I/O port, which is executed by the processor 700 in the course of the execution of the program.

The serial I/O controller 730 may be connected to equipment that allows communication via a serial I/O port. The serial I/O controller 730 may control the communication by digital signals via the serial I/O port, which is executed by the processor 700 in the course of the execution of the program.

The A/D and D/A converter 740 may be connected to equipment that allows communication via an analog port. The A/D and D/A converter 740 may control the communication by analog signals via the analog port, which is executed by the processor 700 in the course of the execution of the program.

By using the user interface 710, the operator may allow the processor 700 to display the execution process of the program and to halt or interrupt the execution of the program.

The CPU 701 of the processor 700 may perform arithmetic processing according to the program. The memory 702 may temporarily store the program in the course of the execution of the program by the CPU 701. Also, the memory 702 may temporarily store the data in the course of the arithmetic processing. The timer 703 may measure the time and the elapsed time, and output the time and the elapsed time to the CPU 701 according to the execution of the program. When image data is inputted to the processor 700, the GPU 704 may process the image data according to the execution of the program, and output the result of the process to the CPU 701.

The equipment connected to the parallel I/O controller 720, which allow communication via the parallel I/O port, may include various devices and other controllers.

The equipment connected to the serial I/O controller 730, which allow communication via the serial I/O port, may include various devices and other controllers.

The equipment connected to the A/D and D/A converter 740, which allow communication via the analog port, may include various sensors.

9. Specific Configuration of Light Beam Separator

Figure 22:
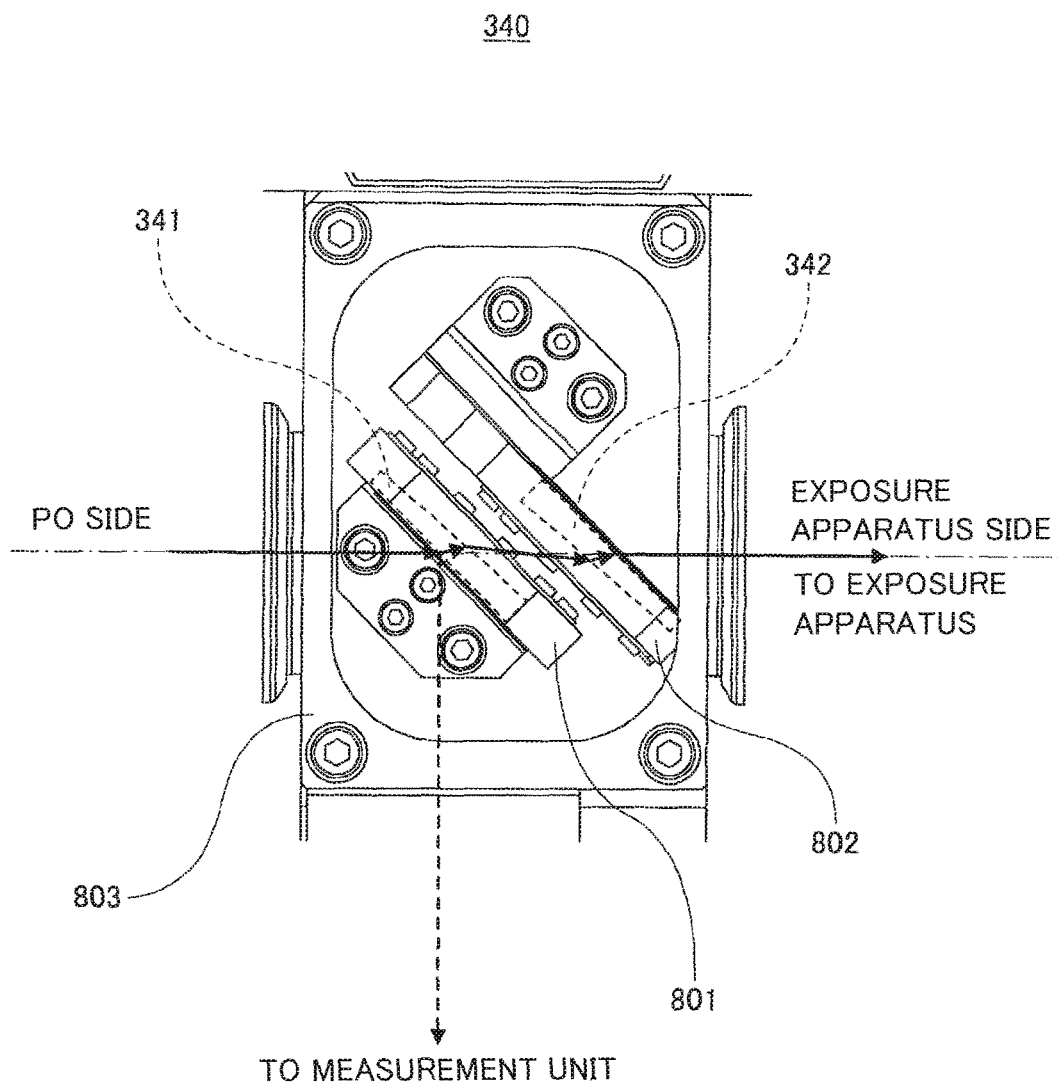
FIG. 22 is a drawing showing the exemplary configuration of the light beam separator.

FIG. 22 shows an exemplary configuration of the light beam separator. The light beam separator 340 shown in FIG. 22 may include the separator beam splitter 341, the separator cancel window 342, a first holder 801, a second holder 802, and a housing 803. Each of the separator beam splitter 341 and the separator cancel window 342 may be a wedged substrate without coating. Each of the separator beam splitter 341 and the separator cancel window 342 may be made of a $CaF_2$ crystal having a coefficient of linear expansion of about $1.84 \times 10^{-7}$. The separator beam splitter 341 and the separator cancel window 342 may be formed in the same size. The separator beam splitter 341 may be held in the first holder 801. The separator cancel window 342 may be held in the second holder 802. The first holder 801 and the second holder 802 may be provided in the housing 803.

The pulsed laser beam from the PO 200 side may enter the separator beam splitter 341. The laser beam having entered the separator beam splitter 341 and having been reflected by the separator beam splitter 341 may enter a measurement unit. This measurement unit may be the polarization measurement unit 310, the beam profile measurement unit 320, or the laser beam-directional stability measurement unit 330. The laser beam having entered and transmitted through the separator beam splitter 341 may be refracted by the separator beam splitter 341, and enter the separator cancel window 342. The laser beam having entered the separator cancel window 342 may be refracted by the separator cancel window 342 in the opposite direction, and transmit through the separator cancel window 342. The laser beam having transmitted through the separator cancel window 342 may be outputted toward the exposure apparatus 500 side. The separator beam splitter 341 and the separator cancel window 342 may be arranged such that the axis of the laser beam outputted toward the exposure apparatus 500 side aligns with the axis of the laser beam entering the separator beam splitter 341.

Figure 23:
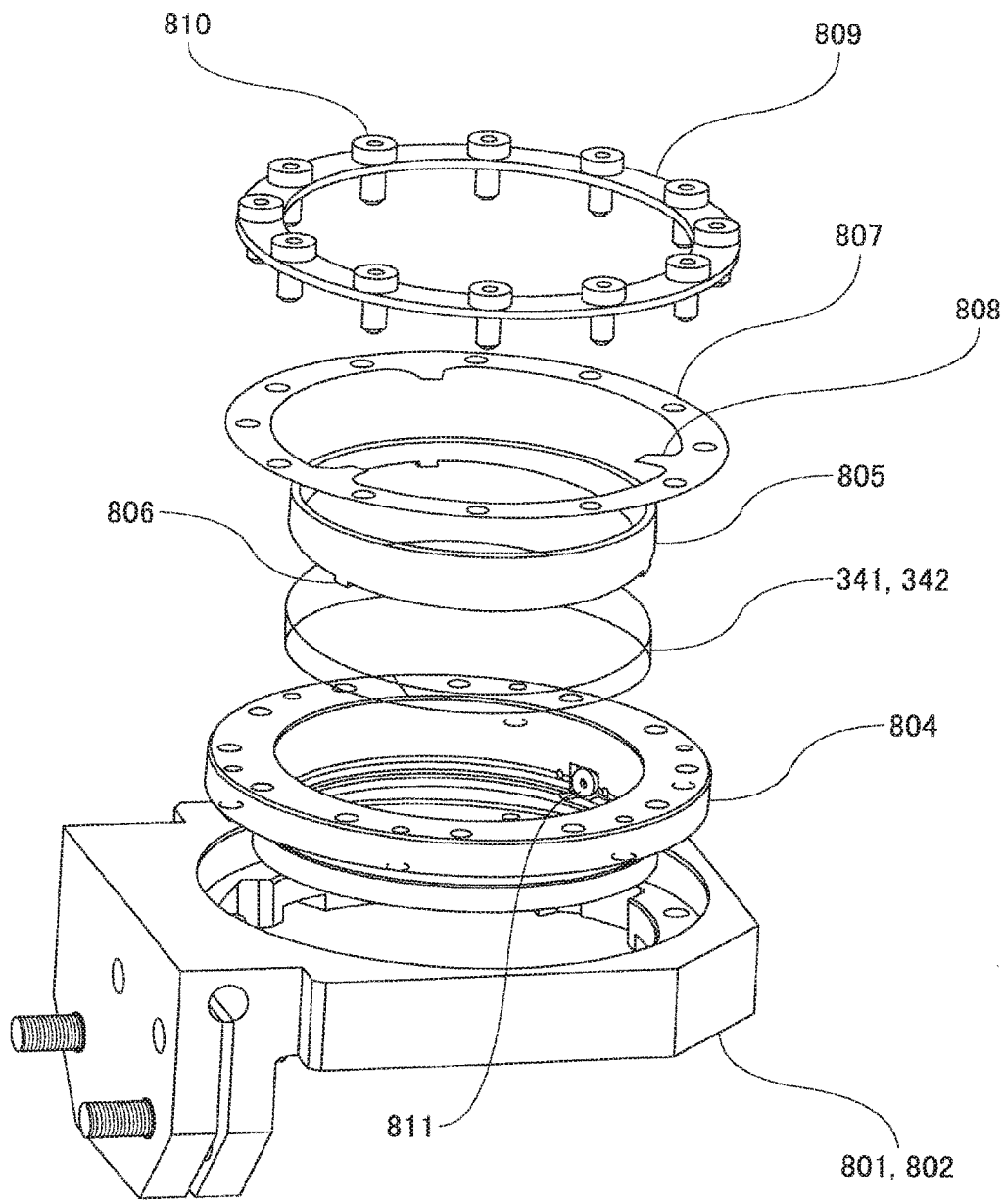
FIG. 23 is an exploded perspective view showing an exemplary holder used in the light beam separator.
Figure 24:
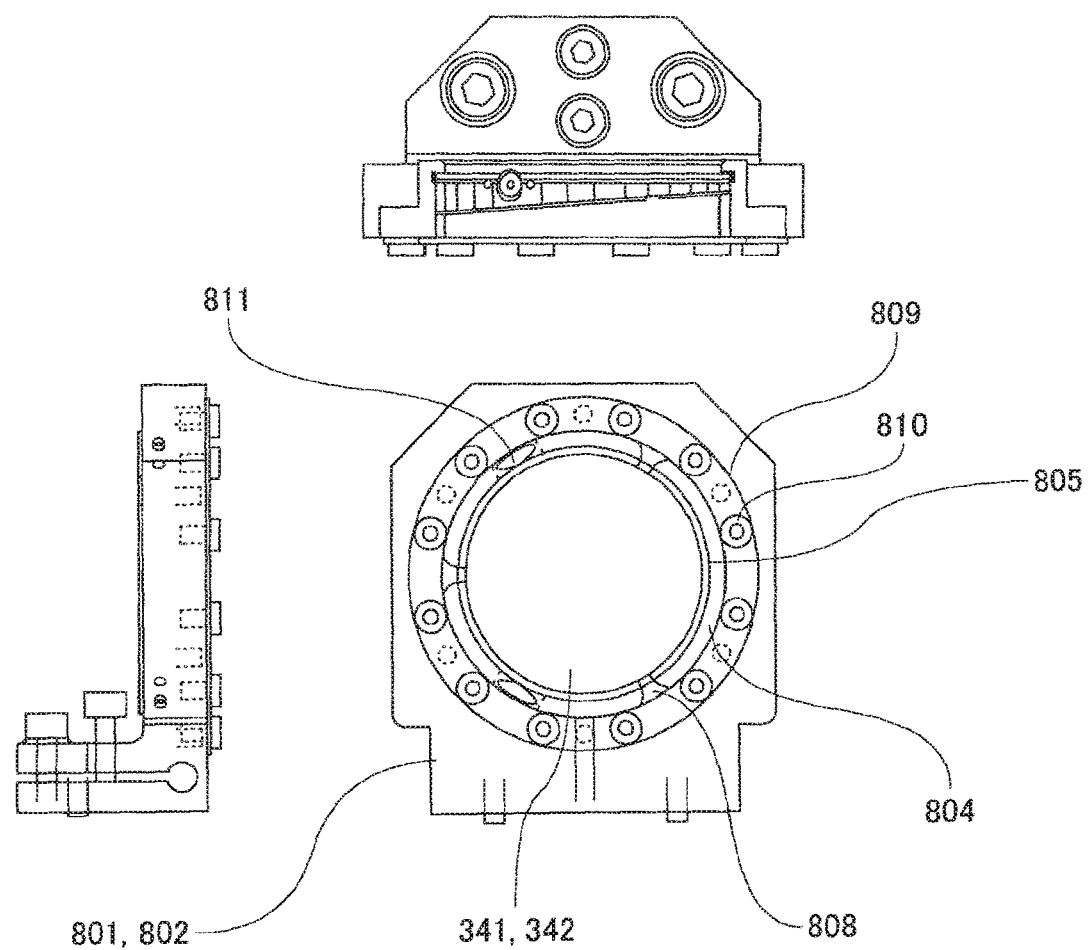
FIG. 24 is a three view drawing showing the exemplary holder used in the light beam separator.
Figure 25:
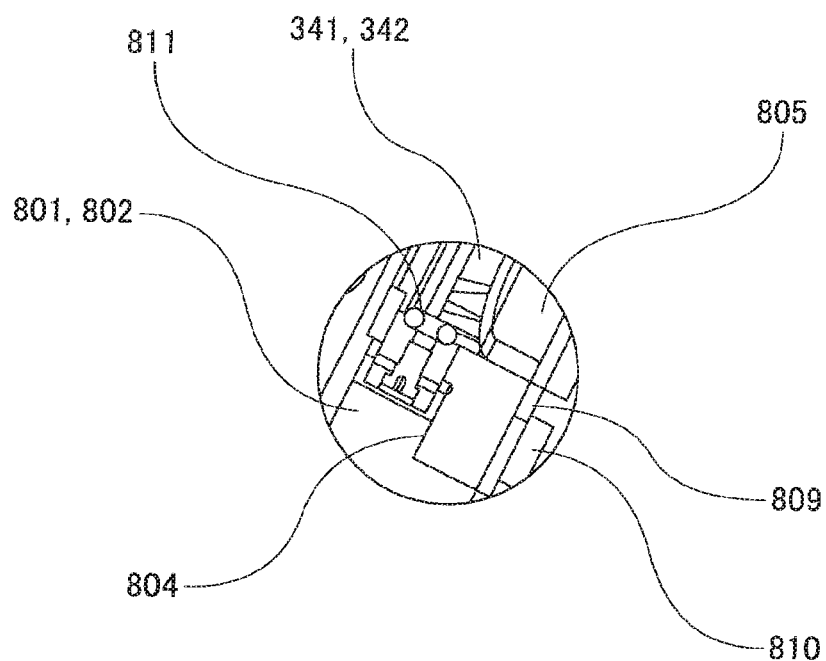
FIG. 25 is a partial view showing the exemplary holder used in the light beam separator.

FIG. 23 is an exploded perspective view showing an exemplary holder used in the light beam separator. FIG. 24 is a three view drawing showing the exemplary holder used in the light beam separator. FIG. 25 is a partial view showing the exemplary holder used in the light beam separator.

As shown in FIGS. 23, 24 and 25, the first holder 801 and the second holder 802 may hold the separator beam splitter 341 and the separator cancel window 342, respectively.

The first holder 801 or the second holder 802 may be made of Super Invar. The Super Invar may include super-invar iron and super-invar steel. The Super Invar may be an alloy of iron, nickel and cobalt. For example, the Super Invar may be a ternary alloy consisting of iron of 63.5%, nickel of 31.5%, and cobalt of 5%. The coefficient of linear expansion of the Super Invar may be about $4 \times 10^{-7}$. When the first holder 801 or the second holder 802 is made of Super Invar, it is possible to prevent the first holder 801 or the second holder 802 from being thermally deformed. By this means, it is possible to prevent the axis of the laser beam outputted toward the exposure apparatus 500 side from being out of alignment with the axis of the laser beam entering the separator beam splitter 341.

A flange 804, the separator beam splitter 341, a spacer 805, an annular flat spring 807, and a stop ring 809 may be arranged at first holder 801 configured to hold the separator beam splitter 341. The flange 804, the separator cancel window 342, the spacer 805, the annular flat spring 807, and the stop ring 809 may be arranged at the second holder 802 configured to hold the separator cancel window 342.

The flange 804 may be mounted and fixed to the first holder 801 or the second holder 802. The flange 804 may be made of the Super Invar. When the flange 804 is made of the Super Invar, it is possible to prevent the flange 804 from being thermally deformed. By this means, it is possible to prevent the axis of the laser beam outputted toward the exposure apparatus 500 side from being out of alignment with the axis of the laser beam entering the separator beam splitter 341. The separator beam splitter 341 or the separator cancel window 342 may be mounted on the flange 804.

The spacer 805 may be provided to press the separator beam splitter 341 or the separator cancel window 342 against the flange 804. The spacer 805 may have three protrusions 806. The spacer 805 may be configured such that the three protrusions 806 press the separator beam splitter 341 or the separator cancel window 342. The spacer 805 may be made of the Super Invar. When the spacer 805 is made of the Super Invar, it is possible to prevent the spacer 805 from being thermally deformed. By this means, it is possible to prevent the axis of the laser beam outputted toward to the exposure apparatus 500 side from being out of alignment with the axis of the laser beam entering the separator beam splitter 341.

The annular flat spring 807 may be provided to press the spacer 805 against the flange 804 and the separator beam splitter 341 or the separator cancel window 342. The annular flat spring 807 may include three wedged portions 808. The annular flat spring 807 may be configured such that the three wedged portions 808 press the spacer 805 and the separator beam splitter 341 or the separator cancel window 342. The annular flat spring 807 may be placed to match the positions of the three wedged portions 808 of the annular flat spring 807 with the positions of the three protrusions 806 of the spacer 805. The annular flat spring 807 may be made of SUS (Steel Use Stainless). For example, SUS 304 having a coefficient of linear expansion of $1.73 \times 10^{-5}$ may be applicable. When the annular flat spring 807 is used, it is possible to prevent the position of the separator beam splitter 341 or the separator cancel window 342 from being changed due to vibration. By this means, it is possible to prevent the axis of the laser beam outputted toward the exposure apparatus 500 side from being out of alignment with the axis of the laser beam entering the separator beam splitter 341.

The stop ring 809 may be provide to press the annular flat spring 807 against the flange 804, the separator beam splitter 341 or the separator cancel window 342, and the spacer 805. The stop ring 809 may be made of the SUS. For example, the SUS 304 having a coefficient of linear expansion of $1.73 \times 10^{-5}$ may be applicable.

Bolts 810 may be made of the Super Invar. When the bolts 810 are made of Super Invar, it is possible to prevent the bolts 810 from being thermally deformed. By this means, it is possible to prevent the axis of the laser beam outputted toward the exposure apparatus 500 side from being out of alignment with the axis of the laser beam entering the separator beam splitter 341.

The flange 804 may include holes to receive the bolts 810. The annular flat spring 807 and the stop ring 809 may include holes into which the bolts 810 are inserted. The bolts 810 may be inserted into the flange 804 through the stop ring 809 and the annular flat spring 807. By this means, the separator beam splitter 341 or the separator cancel window 342, the spacer 805 and the annular flat spring 807 may be fixed between the flange 804 and the stop ring 809.

The flange 804 may include one or more O-rings 811. The one or more O-rings 811 may be made of rubber. When the one or more O-rings 811 are provided in the flange 804, it is possible to prevent the separator beam splitter 341 or the separator cancel window 342 from rotating in the flange 804. By this means, it is possible to prevent the axis of the laser beam outputted toward to the exposure apparatus 500 side from being out of alignment with the axis of the laser beam entering the separator beam splitter 341.

10. Embodiment 4 (Light Beam Measurement Device)

Figure 26A:
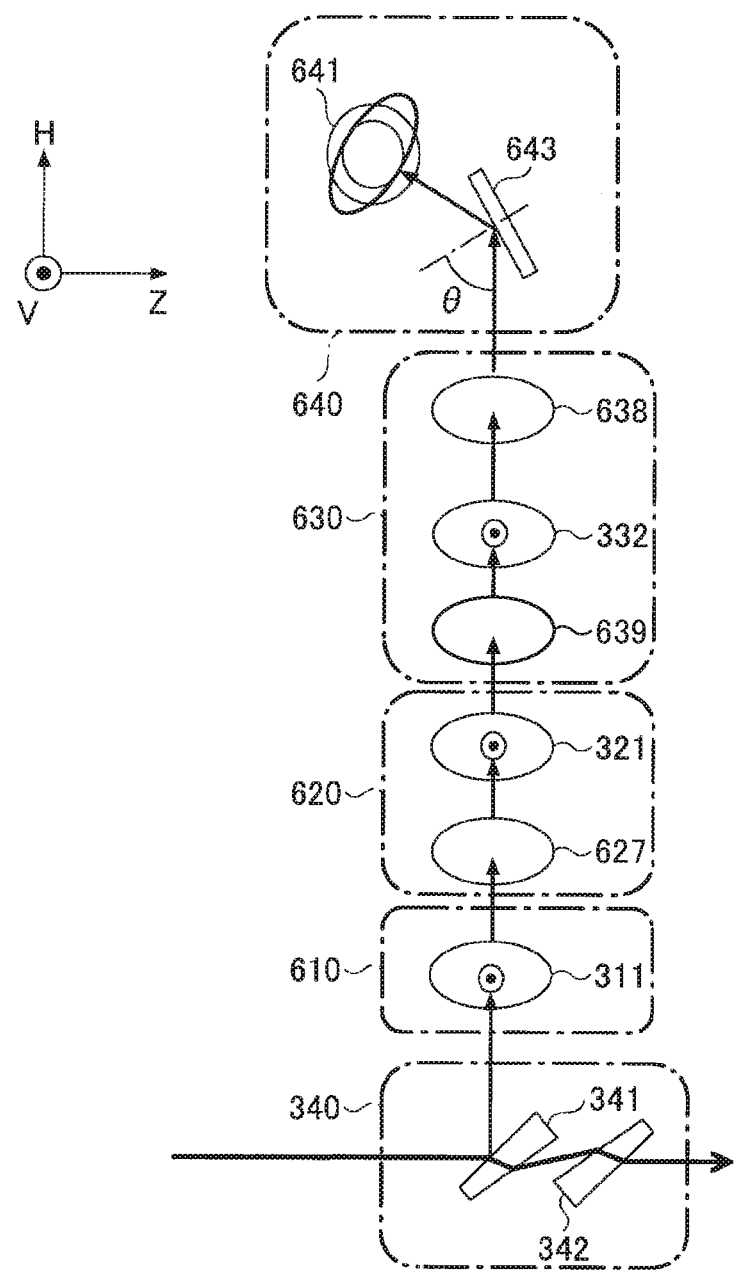
FIG. 26A is a structural drawing showing a light beam measurement device according to Embodiment 4.
Figure 26B:
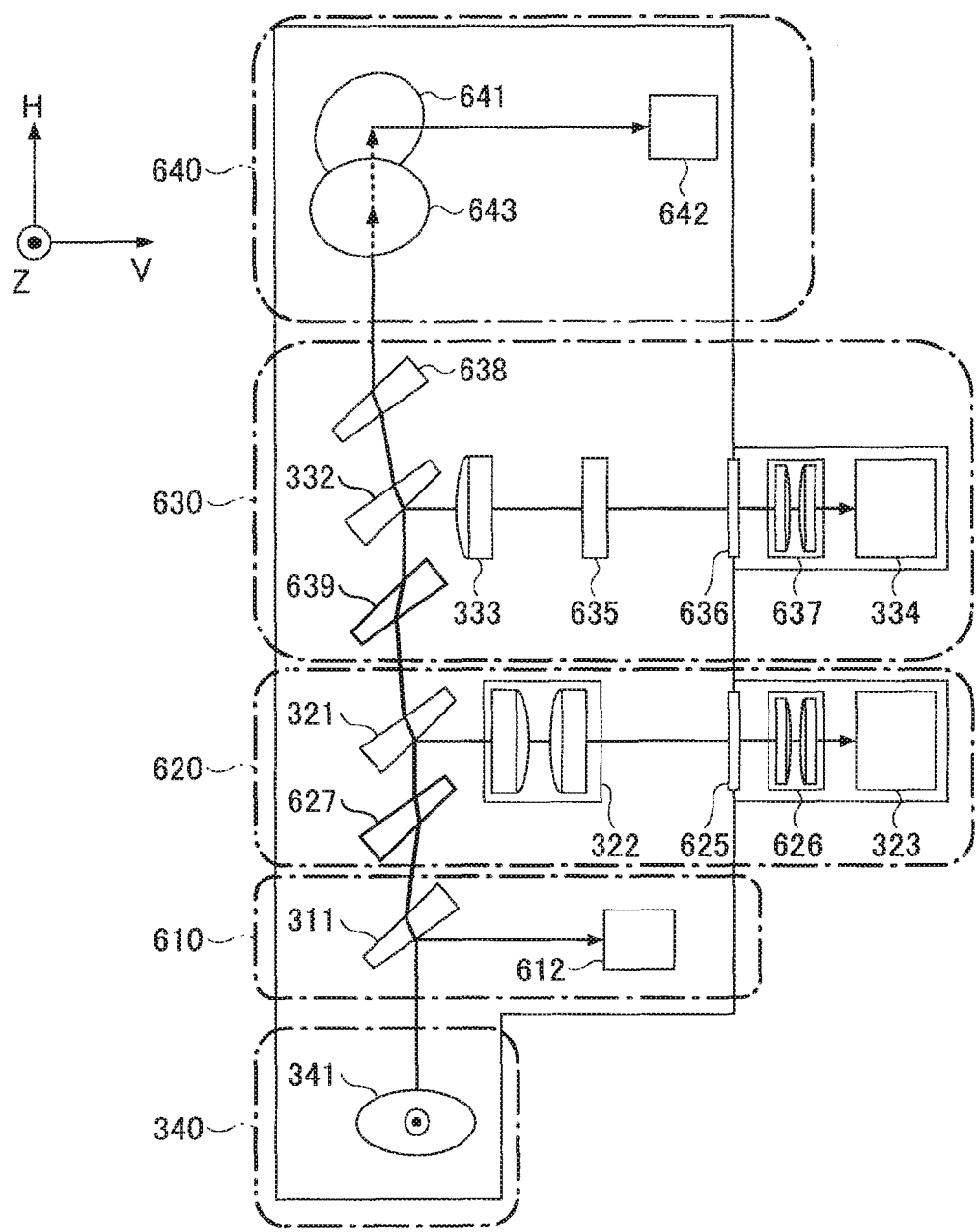
FIG. 26B is a structural drawing showing the light beam measurement device according to Embodiment 4.

Next, with reference to FIGS. 26A and 26B, the light beam measurement device according to Embodiment 4 will be described. Here, FIG. 26A is a plan view showing the light beam measurement device according to the present embodiment, which is parallel to the H-Z plane. FIG. 26B is a plane view showing the light beam measurement device according to the present embodiment, which is parallel to the H-V plane. In addition, a coordinate axis shown in each of the FIGS. 26A and 26B represents the direction of the pulsed laser beam traveling to the exposure apparatus. Here, the light beam measurement device according to the present embodiment may be replaced with the light beam measurement device 300 according to Embodiment 1 shown in FIG. 1 and so forth, or the light beam measurement device 300 according to Embodiment 2 shown in FIG. 11 and so forth.

The light bream measurement device according to the present embodiment is different from the light beam measurement device according to Embodiment 2 in that the first cancel window 627 is provided, instead of the cancel window 624 of the beam profile measurement unit 620. Moreover, the light bream measurement device according to the present embodiment is different from the light beam measurement device according to Embodiment 2 in that a second cancel window 639 is additionally provided in the laser beam-directional stability measurement unit 630.

The first cancel window 627 may be provided on the optical path of the pulsed laser beam having transmitted through the first measurement beam splitter 311. The first cancel window 627 may be provided between the first measurement beam splitter 311 and the second measurement beam splitter 321. The first cancel window 627 may correct the axis of the optical path of the pulsed laser beam having transmitted through the first measurement beam splitter 311 to be approximately parallel to the axis of the optical path of the pulsed laser beam entering the first measurement beam splitter 311. Here, the pulsed laser beam entering the first measurement beam splitter 311 may be the pulsed laser beam having been separated by the light beam separator 340.

With the above-described configuration, the pulsed laser beam having transmitted through and exited the first cancel window 627 has the axis of the optical path approximately parallel to the axis of the optical path of the pulsed laser beam entering the first measurement beam splitter 311, and can enter the second measurement beam splitter 321. Part of the pulsed laser beam having entered the second measurement beam splitter 321 may be reflected at a reflection angle of 45 degrees, and enters the transfer optical system 322, while the other part may transmit through the second measurement beam splitter 321. The pulsed laser beam having entered the transfer optical system 322 may enter the image sensor 323 via the fluorescent screen 625 and the transfer optical system 626, so that the beam profile of that pulsed laser beam can be measured.

The second cancel window 639 may be provided on the optical path of the pulsed laser beam having transmitted through the second measurement beam splitter 321. The second cancel window 639 may be provided between the second measurement beam splitter 321 and the third measurement beam splitter 332. The second cancel window 639 may correct the axis of the optical path of the pulsed laser beam having transmitted through the second measurement beam splitter 321 to be approximately parallel to the axis of the optical path of the pulsed laser beam entering the second measurement beam splitter 321.

With the above-described configuration, the pulsed laser beam having transmitted through and exited the second cancel window 639 has the axis of the optical path approximately parallel to the axis of the optical path of the pulsed laser beam entering the second measurement beam splitter 321, and can enter the third measurement beam splitter 332. Part of the pulsed laser beam having entered the third measurement beam splitter 332 may be reflected at a reflection angle of 45 degrees and enters the light focusing optical system 333, and the other part may transmit through the third measurement beam splitter 332. The pulsed laser beam having entered the light focusing optical system 333 may enter the image sensor 334 via the attenuation plate 635, the fluorescent screen 636 and the transfer optical system 637, so that the laser beam-directional stability of that pulsed laser beam can be measured. By this means, it is possible to prevent the data measured by the laser beam-directional stability measurement unit 630 from being distorted.

As described above, the light beam measurement device according to the present embodiment includes the first cancel window 627 and the second cancel window 639, and therefore it is possible to prevent the data measured by the beam profile measurement unit 620 and the laser beam-directional stability measurement unit 630 from being distorted.

With the present embodiment, the first measurement beam splitter 311, the second measurement beam splitter 321, the third measurement beam splitter 332, the first cancel window 627, the second cancel window 639, and the cancel window 638 may be formed to have the same configuration as the separator beam splitter 341 and the separator cancel window 342 shown in FIGS. 5A to 6B, as described later.

For example, each of the first measurement beam splitter 311, the second measurement beam splitter 321, the third measurement beam splitter 332, the first cancel window 627, the second cancel window 639, and the cancel window 638 may be formed by a wedged substrate. In this case, the first measurement beam splitter 311 and the first cancel window 627 may be paired, and formed by the wedged substrates having the same structure and property. The second measurement beam splitter 321 and the second cancel window 639 may be paired, and formed by the wedged substrates having the same structure and property. The third measurement beam splitter 332 and the cancel window 638 may be paired, and formed by the wedged substrates having the same structure and property. Then, the surface of the first measurement beam splitter 311 into which the pulsed laser beam enters and the surface of the first cancel window 627 from which the pulsed laser beam exits may be approximately parallel to one another. The surface of the first measurement beam splitter 311 from which the pulsed laser beam exits and the surface of the first cancel window 627 into which the pulsed laser beam enters may be approximately parallel to one another. The surface of the second measurement beam splitter 321 into which the pulsed laser beam enters and the surface of the second cancel window 639 from which the pulsed laser beam exits may be approximately parallel to one another. The surface of the second measurement beam splitter 321 from which the pulsed laser beam exits and the surface of the second cancel window 639 into which the pulsed laser beam enters may be approximately parallel to one another. The surface of the third measurement beam splitter 332 into which the pulsed laser beam enters and the surface of the cancel window 638 from which the pulsed laser beam exits may be approximately parallel to one another. The surface of the third measurement beam splitter 332 from which the pulsed laser beam exits and the surface of the cancel window 638 into which the pulsed laser beam enters may be approximately parallel to one another.

In addition, for example, each of the first measurement beam splitter 311, the second measurement beam splitter 321, the third measurement beam splitter 332, the first cancel window 627, the second cancel window 639, and the cancel window 638 may be made of a $CaF_2$ crystal. In this case, the surface of each of the first measurement beam splitter 311, the second measurement beam splitter 321, and the third measurement beam splitter 332 into which the pulsed laser beam enters may be ground to be approximately perpendicular to the <111> axis of the $CaF_2$ crystal. In addition, the surface of each of the first cancel window 627, the second cancel window 639, and the cancel window 638 from which the pulsed laser beam exits may be ground to be approximately perpendicular to the <111> axis of the $CaF_2$ crystal. Moreover, in this case, each of the first measurement beam splitter 311, the second measurement beam splitter 321, and the third measurement beam splitter 332 may be arranged such that the angle between the axis of the optical path of the pulsed laser beam entering thereinto and the <001> axis is about 60 degrees, viewed from the <111> axis normal to the surface into which the pulsed laser beam enters. In other words, each of the first measurement beam splitter 311, the second measurement beam splitter 321, and the third measurement beam splitter 332 may be arranged such that the optical path of the pulsed laser beam entering thereinto is approximately parallel to the plane containing the <111> axis and the <010> axis of the $CaF_2$ crystal. In addition, each of the first cancel window 627, the second cancel window 639, and the cancel window 638 may be arranged such that the angle between the axis of the optical path of the pulsed laser beam exiting therefrom and the <001> axis is about 60 degrees, viewed from the <111> axis normal to the surface from which the pulsed laser beam exits. In other words, each of the first cancel window 627, the second cancel window 639, and the cancel window 638 may be arranged such that the optical path of the pulsed laser beam exiting therefrom is approximately parallel to the plane containing the <111> axis and the <010> axis of the $CaF_2$ crystal.

With the above-described configuration, even if the first measurement beam splitter 311, the second measurement beam splitter 321, the third measurement beam splitter 332, the first cancel window 627, the second cancel window 639, and the cancel window 638 absorb the pulsed laser beam, and therefore generate thermal stress, it is possible to prevent the change in the polarization of the pulsed laser beam exiting therefrom.

Here, a dielectric multilayer for partially reflecting the pulsed laser beam may not be formed on each of the first measurement beam splitter 311, the second measurement beam splitter 321, the third measurement beam splitter 332, the first cancel window 627, the second cancel window 639, and the cancel window 638.

The above-described embodiments and the modifications thereof are merely examples for implementing the present disclosure, and the present disclosure is not limited thereto. Making various modifications according to the specifications or the like falls within the scope of the present disclosure, and it is apparent from the above description that other various embodiments are possible within the scope of the present disclosure.

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

REFERENCE SIGNS LIST

100 MO
110 MO laser chamber
110a window
110b window
111a electrode (first electrode)
111b electrode (second electrode)
112 MO charger
113 MO-PPM
113a switch
114 LNM (line narrowing module)
114a prism
114b prism
114c grating
114d rotation stage
115 OC (output coupler) mirror
117 MO energy measurement unit
120 wavelength adjusting part
200 PO
210 PO laser chamber
210a window
210b window
211a electrode (first electrode)
211b electrode (second electrode)
212 PO charger
213 PO-PPM
213a switch
215 partial reflection mirror
216 OC mirror
220 PO laser beam measurement part
221 PO energy measurement unit
222 spectrum measurement unit
223 beam splitter
224 beam splitter
300 light beam measurement device
310 polarization measurement unit
311 first measurement beam splitter
312 aperture
313 attenuation plate
314 Rochon prism
315 image sensor
320 beam profile measurement unit
321 second measurement beam splitter
322 transfer optical system
323 image sensor
330 laser beam-directional stability measurement unit
331 measurement cancel window
332 third measurement beam splitter
333 light focusing optical system
334 image sensor
340 light beam separator
341 separator beam splitter
342 separator cancel window
350 controller
360 beam measurement controller
420 laser controller
421 energy controller
422 wavelength controller
430 data collecting and processing system
440 FDC system
500 exposure apparatus
510 exposure apparatus controller
801 first holder
802 second holder
803 housing
804 flange
805 spacer
806 protrusion
807 annular flat spring
808 wedged portion
809 stop ring
810 bolt
811 O-ring

The invention claimed is:

1. A light beam measurement device comprising:
a polarization measurement device including a first measurement beam splitter provided on an optical path of a laser beam and configured to measure a polarization state of the laser beam having been partially reflected by the first measurement beam splitter;
a beam profile measurement device including a second measurement beam splitter provided on the optical path of the laser beam and configured to measure a beam profile of the laser beam having been partially reflected by the second measurement beam splitter; and
a laser beam-directional stability measurement device configured to measure a stability in a traveling direction of the laser beam,
the first measurement beam splitter and the second measurement beam splitter being made of a material containing $CaF_2$.

2. The light beam measurement device according to claim 1, wherein the laser beam having transmitted through the first measurement beam splitter enters the second measurement beam splitter.

3. The light beam measurement device according to claim 1, wherein:
the laser beam-directional stability measurement device includes a third measurement beam splitter provided on the optical path of the laser beam and configured to measure the stability in the traveling direction of the laser beam having been partially reflected by the third measurement beam splitter; and
the third measurement beam splitter is made of a material containing $CaF_2$.

4. The light beam measurement device according to claim 3, wherein:
the laser beam having transmitted through the first measurement beam splitter enters the second measurement beam splitter; and
the laser beam having transmitted through the second measurement beam splitter enters the third measurement beam splitter.

5. The light beam measurement device according to claim 1, further comprising a light beam separator configured to reflect part of the laser beam and enter the part into the first measurement beam splitter, wherein the light beam separator is made of a material containing $CaF_2$.

6. The light beam measurement device according to claim 1, wherein:
the polarization measurement device includes a first polarization measurement device and a second polarization measurement device; and
one or both of the first polarization measurement device and the second polarization measurement device detect(s) a polarization component of the laser beam.

7. The light beam measurement device according to claim 1, wherein the polarization measurement device detects a polarization component of the laser beam.

8. A light beam measurement device comprising:
a polarization measurement device configured to measure a polarization state of a laser beam;
a beam profile measurement device configured to measure a beam profile of the laser beam;
a laser beam-directional stability measurement device configured to measure a stability in a traveling direction of the laser beam; and
a plurality of measurement beam splitters made of a material containing $CaF_2$ and provided on an optical path of the laser beam,
wherein the polarization measurement device, the beam profile measurement device and the laser beam-directional stability measurement device measure laser beams split by the plurality of measurement beam splitters, respectively.

9. A laser apparatus comprising:
a laser chamber configured to emit a laser beam; and
the light beam measurement device configured to measure the emitted laser beam, according to claim 1.

10. The beam measurement device according to claim 7, further comprising:
a first cancel window provided on the optical path of the laser beam having transmitted through the first measurement beam splitter, and configured to correct an axis of the optical path of the laser beam having transmitted through the first measurement beam splitter to be approximately parallel to an axis of the optical path of the laser beam entering the first measurement beam splitter; and
a second cancel window provided on the optical path of the laser beam having transmitted through the second measurement beam splitter, and configured to correct an axis of the optical path of the laser beam having transmitted through the second measurement beam splitter to be approximately parallel to an axis of the optical path of the laser beam entering the second measurement beam splitter.

11. The light beam measurement device according to claim 10, wherein:
the laser beam-directional stability measurement device includes a third measurement beam splitter provided on the optical path of the laser beam;
the laser beam-directional stability measurement device measures the stability in the traveling direction of the laser beam partially reflected by the third measurement beam splitter;
the third measurement beam splitter is made of a material containing $CaF_2$;
the first cancel window is provided between the first measurement beam splitter and the second measurement beam splitter; and
the second cancel window is provided between the second measurement beam splitter and the third measurement beam splitter.

12. The light beam measurement device according to claim 11, wherein:
the beam profile measurement device measures a beam profile of the laser beam having transmitted through the first cancel window and partially reflected by the second measurement beam splitter; and
the laser beam-directional stability measurement device measures the stability in the traveling direction of the laser beam having transmitted through the second cancel window and partially reflected by the third measurement beam splitter.

13. The light beam measurement device according to claim 1, wherein the polarization measurement device includes a Rochon prism.

14. The light beam measurement device according to claim 1, wherein the polarization measurement device includes an image sensor.

15. The light beam measurement device according to claim 1, wherein the polarization measurement device includes a polarizer.

16. The light beam measurement device according to claim 15, wherein the polarizer is provided such that an incident angle of the laser beam is a Brewster's angle.

17. The light beam measurement device according to claim 1, wherein the beam profile measurement device includes an image sensor.

18. The light beam measurement device according to claim 1, wherein the beam profile measurement device includes a fluorescent screen.

19. The light beam measurement device according to claim 1, wherein the laser beam-directional stability measurement device includes an image sensor.

20. The light beam measurement device according to claim 1, wherein the laser beam-directional stability measurement device includes a fluorescent screen.

* * * * *